US012565391B2

(12) United States Patent

Uemizo et al.

(10) Patent No.: US 12,565,391 B2

(45) Date of Patent: Mar. 3, 2026

(54) PAPER SHEET STORAGE CONTAINER

(71) Applicant: JAPAN CASH MACHINE CO., LTD., Osaka (JP)

(72) Inventors: Yoshiaki Uemizo, Osaka (JP); Takashi Ueda, Osaka (JP)

(73) Assignee: Japan Cash Machine Co., Ltd. (JP)

( * ) Notice: Subject to any disclaimer, the term of this patent is extended or adjusted under 35 U.S.C. 154(b) by 0 days.

(21) Appl. No.: 18/044,112

(22) PCT Filed: May 12, 2021

(86) PCT No.: PCT/JP2021/017975

§ 371 (c)(1),
(2) Date: Mar. 6, 2023

(87) PCT Pub. No.: WO2022/064757

PCT Pub. Date: Mar. 31, 2022

(65) Prior Publication Data

US 2023/0312277 A1 Oct. 5, 2023

(30) Foreign Application Priority Data

Sep. 24, 2020 (JP) ................................ 2020-159669

(51) Int. Cl.

*B65H 3/48* (2006.01)
*B65H 1/12* (2006.01)
(Continued)

(52) U.S. Cl.

CPC ................. *B65H 3/48* (2013.01); *B65H 1/12* (2013.01); *B65H 3/08* (2013.01); *B65H 3/54* (2013.01);
(Continued)

(58) Field of Classification Search

CPC ... B65H 1/12; B65H 3/08; B65H 3/34; B65H 3/48; B65H 3/54; B65H 31/04;
(Continued)

(56) References Cited

U.S. PATENT DOCUMENTS

| | | | | | |
|---|---|---|---|---|---|
| 4,033,579 | A * | 7/1977 | Stange | B65H 29/246 | 271/195 |
| 5,915,683 | A * | 6/1999 | Otsuka | B65H 3/128 | 271/30.1 |
| 6,015,144 | A * | 1/2000 | Yoshii | B65H 3/48 | 271/97 |

(Continued)

FOREIGN PATENT DOCUMENTS

| | | |
|---|---|---|
| JP | S56-13440 U | 2/1981 |
| JP | 04-023747 A | 1/1992 |
| JP | 08-040585 A | 2/1996 |
| JP | 2001-067522 A | 3/2001 |

OTHER PUBLICATIONS

WO, English Translation of International Search Report; PCT/JP2021/017975, Jul. 13, 2022 (3 pages).

*Primary Examiner* — Prasad V Gokhale

(74) *Attorney, Agent, or Firm* — FisherBroyles, LLP; Rob L. Phillips

(57) ABSTRACT

A paper sheet storage container capable of accurately taking out paper sheets one-by-one. A paper sheet group is held by a paper sheet placing table and holding members, while the paper sheet placing table is being biased upward by an elastic member so that the position of an uppermost paper sheet of the paper sheet group placed on the paper sheet placing table is substantially the same position as the positions of holes through which air flows. In this state, in the paper sheet storage container, air is blown from a side to the uppermost paper sheet of the paper sheet group placed on the paper sheet placing table thereby allowing the uppermost paper sheet to be brought into a state in which the vicinity of the center thereof has been raised.

14 Claims, 24 Drawing Sheets

(51) Int. Cl.
*B65H 3/08* (2006.01)
*B65H 3/54* (2006.01)
*B65H 31/10* (2006.01)
*B65H 31/14* (2006.01)
*G07D 11/13* (2019.01)
*G07D 11/30* (2019.01)

(52) U.S. Cl.
CPC ............. *B65H 31/10* (2013.01); *B65H 31/14* (2013.01); *B65H 2405/10* (2013.01); *B65H 2405/11* (2013.01); *B65H 2406/10* (2013.01); *G07D 11/13* (2019.01); *G07D 11/30* (2019.01)

(58) Field of Classification Search
CPC ........ B65H 31/08; B65H 31/10; B65H 31/14; B65H 31/26; B65H 2301/422542; B65H 2301/422548; B65H 2406/10; B65H 2406/11; B65H 2406/113; B65H 2406/1132; B65H 2406/12; B65H 2406/122
See application file for complete search history.

(56) References Cited

U.S. PATENT DOCUMENTS

2005/0285326 A1* 12/2005 Uji .......................... B65H 3/48
271/97
2008/0088078 A1* 4/2008 Kushida .................. B65H 3/54
271/90
2012/0104681 A1* 5/2012 Koyama .............. B65H 3/0623
271/119

* cited by examiner

State D1

State D1

PAPER SHEET STORAGE CONTAINER

CROSS-REFERENCE TO RELATED APPLICATIONS

The present invention is filed under 35 U.S.C. § 371 as the U.S. national phase of International Patent Application No. PCT/JP2021/017975, filed May 12, 2021, which designated the United States and which claims the benefit of Japanese Patent Application No. 2020-159669, filed Sep. 24, 2020, which is hereby incorporated in its entirety including all tables, figures, and claims.

TECHNICAL FIELD

The present invention relates to a technique for a container for storing paper sheets.

BACKGROUND ART

For example, a bill processing system has been developed to collect bills stored in a cash box detachably mounted on a gaming machine or the like of a casino, and to confirm whether the sales amount for each cash box and the total amount of bills actually collected from the cash box coincide with each other.

If the bill processing system performs bill counting processing for each bill bundle collected from the cash box, continuously counting bills cannot be performed and thus the efficiency is low. To cope with this, the bill handling system ties up (stacks) bill bundles collected from a plurality of cash boxes (for example, bill bundle Bills(CB1) to Bills(CBN) in FIG. 24, N: natural number, CBk: k-th (1≤k≤N) cash box, bill bundle Bills(CBk): bill bundle collected from the k-th cash box) to create a batch (bill bundle group) (for example, batches Batch1 to BatchN in FIG. 24) and create a batch group by collecting a plurality of batches (for example, a batch group Batch_G1 in FIG. 24), and then the batch group is applied to an automatic bill counting machine (sorter) to perform bill counting. This allows the bill processing system to perform bill counting processing continuously without stopping the automatic bill counting machine (sorter), thus allowing for performing bill counting processing efficiently. At this time, the automatic bill counting machine (sorter) inserts separator cards (for example, separator cards Sep_card1 to Sep_cardN in FIG. 24) into the bill bundles taken out from the respective cash boxes to generate a batch (bill bundle group) (for example, the batches Batch1 to BatchN in FIG. 24) so that the total amount of money for the bills stored in each cash box can be obtained (e.g., see Patent Document 1). For example, a bar code is printed on the separator card, and reading the bar code by the automatic bill counting machine (sorter) allows for specifying the separator card. For example, the bill processing system identifies a cash box by reading information of a tag (for example, a RF tag) assigned to each cash box, obtains information (for example, information specified by a barcode printed on the front surface of the separator card) specifying the separator card inserted into the bill bundle taken out from the cash box, and generates data in which information identifying the cash box is associated with information specifying the separator card. In the bill processing system, the automatic bill counter (sorter) can recognize that the bill bundle partitioned by the separator card is the bill bundle collected from the cash box associated with the separator card from the data in which the information identifying the cash box has been associated with the information specifying the separator card, and furthermore can obtain the total amount of money collected from the cash box.

As described above, using the separator card, the bill processing system can achieve continuous bill counting processing, and furthermore can obtain the total amount of money for bill bundles collected from the individual cash boxes.

PRIOR ART DOCUMENTS

Patent Document 1: Japanese Patent Application Publication No. 2001-67522

DISCLOSURE OF INVENTION

Technical Problem

To perform the above processing, the bill handling system needs to insert the separator cards one-by-one into the bill bundle collected from the cash box. In order to realize this, for example, it is conceivable to take out the separators one-by-one from a container containing a plurality of separator cards, and then insert the taken-out separator cards into the bill bundle collected from the cash box (for example, it is conceivable to place the separator cards one-by-one on the bill bundle collected from the cash box). In other words, it is conceivable to use a paper sheet feeding device that takes out a separator card one-by-one from a container containing a plurality of separator cards.

However, such a paper sheet feeding device requires a complicated sheet feeding mechanism (for example, a sheet feeding mechanism for taking out paper sheets one-by-one) in order to take out a separator card one-by-one from a container containing a plurality of separator cards, and also requires a sensor or the like for detecting whether the fed separator cards overlap. Thus, when the separator is taken out one-by-one from the container containing the plurality of separator cards and the taken-out separator card is inserted into the bill bundle collected from the cash box using the paper sheet feeding device as described above, the cost is high.

Alternatively, it is conceivable that the separator is taken out one-by-one from the container containing the plurality of separator cards by hand, and then the taken-out separator card is inserted into the bill bundle collected from the cash box; however, in this case, labor costs are still required and thus the cost is high.

For this reason, there is a demand for a technique capable of reliably taking out paper sheets (for example, separator cards) one-by-one using a simple mechanism.

In view of the above problems, an object of the present invention is to provide a paper sheet storage container capable of accurately taking out paper sheets (for example, separator cards) one-by-one with a simple mechanism.

Solution to Problem

To solve the above problems, a first aspect of the present invention provides a paper sheet storage container including a bottom portion, a paper sheet placing table configured to place paper sheets, an elastic member, a holding member, and a side wall portion.

The elastic member is disposed between the bottom portion and the paper sheet placing table, and is a member configured to urge the paper sheet placing table upward.

The holding member is a member configured to hold paper sheets placed on the paper sheet placing table together with the paper sheet placing table.

The side wall portion is provided with a hole for allowing air to flow from the outside to the vicinity of a height substantially the same as a height at which the surface of the uppermost paper sheet is located when paper sheets are placed on the paper sheet placing table.

In this paper sheet storage container, the paper sheet group is held by the paper sheet placing table and the holding member while the paper sheet placing table is being biased upward by the elastic member so that the position (height) of the uppermost paper sheet of the paper sheet group placed on the paper sheet placing table is substantially the same position (height) as the position of the holes through which air flows. In this state, in this paper sheet storage container, air is blown from the side (horizontally) to the uppermost paper sheet of the paper sheet group placed on the paper sheet placing table 3, thereby allowing the uppermost paper sheet to be brought into a state in which the vicinity of the center thereof has been raised and allowing for separating paper sheets in the vicinity of the uppermost portion by air (allowing for forming a gap). In this state, for example, sucking the vicinity of the center of the uppermost paper sheet and then lifting the paper sheet upward allows for easily and reliably taking out the uppermost paper sheet from the paper sheet storage container.

Thus, the paper sheet storage container makes it possible to accurately take out paper sheets (for example, separator cards) one-by-one with a simple mechanism.

A second aspect of the present invention provides a paper sheet storage container including a bottom portion, a paper sheet placing table configured to place paper sheets, an elastic member, a holding member, and a side wall portion.

The elastic member is disposed between the bottom portion and the paper sheet placing table, and is a member configured to urge the paper sheet placing table upward.

The holding member is a member configured to hold paper sheets placed on the paper sheet placing table together with the paper sheet placing table.

The side wall portion is provided with a hole for allowing air to flow from the outside to a position lower than a height at which the surface of the uppermost paper sheet is located when paper sheets are placed on the paper sheet placing table.

In this paper sheet storage container, the paper sheet group is held by the paper sheet placing table and the holding member while the paper sheet placing table is being biased upward by the elastic member so that the position of the hole through which air flows is lower than the position (height) of the uppermost paper sheet of the paper sheet group placed on the paper sheet placing table. In this state, in the paper sheet storage container, air is blown, from below the uppermost paper sheets, to the uppermost paper sheet of the paper sheet group placed on the paper sheet placing table 3, thereby allowing the uppermost paper sheet to be brought into a state in which the vicinity of the center thereof has been raised and allowing for separating paper sheets in the vicinity of the uppermost portion by air (allowing for forming a gap between paper sheets). In this state, for example, sucking the vicinity of the center of the uppermost paper sheet and then lifting the paper sheet upward allows for easily and reliably taking out the uppermost paper sheet from the paper sheet storage container.

Thus, the paper sheet storage container makes it possible to accurately take out paper sheets (for example, separator cards) one-by-one with a simple mechanism.

A third aspect of the present invention provides the paper sheet storage container of according to the first or second aspect of the present invention further includes a flow path regulating member configured to regulate the flow path of the air.

This allows the paper sheet storage container to regulate the flow path of the air, thus allowing the uppermost paper sheet of the paper sheet group placed on the paper sheet placing table to be raised more efficiently. In particular, when the number of remaining paper sheets placed on the paper sheet placing table is one to several, the flow rate of air flowing into the inside of the paper sheet storage container increases near the center of the lower surface of the remaining one to several paper sheets placed on the paper sheet placing table due to the flow path regulating member. This causes a state in which the vicinity of the center of the remaining one to several paper sheets placed on the paper sheet placing table has been raised. This allows the paper sheet storage container to reliably take out paper sheets one-by-one even when the remaining one to several sheets of paper sheets are placed on the paper sheet placing table.

A fourth aspect of the present invention provides the paper sheet storage container of the third aspect of the present invention in which the flow path regulating member is provided on the paper sheet placing table, and is provided at a position that causes the flow rate of air in the vicinity of the center on the paper sheet placing table to be greater than the flow rate of air other than the vicinity of the center on the paper sheet placing table.

This allows air to be concentrated in the vicinity of the center on the paper sheet placing table in the paper sheet storage container, thus allowing the vicinity of the center of the uppermost paper sheet of the paper sheet group placed on the paper sheet placing table to be raised more efficiently.

A fifth aspect of the present invention provides the paper sheet storage container of any one of the first to the fourth aspects of the present invention in which the holding member rotatably installed around a rotational shaft along an inner wall of the side wall portion near the upper end of the side wall portion, the holding member including a lock mechanism configured to lock rotation.

(1) When the rotation has been locked by the lock mechanism, the holding member holds paper sheets to be placed on the paper sheet placing table together with the paper sheet placing table, and (2) when the rotation has not been locked by the lock mechanism, the holding member rotates to allow the paper sheets to be inserted into the paper sheet storage container from the outside.

Accordingly, in the paper sheet storage container, when the holding member is in the unlocked state, the paper sheets can be inserted into the paper sheet storage container from the outside, and when the holding member is in the locked state, the paper sheets placed on the paper sheet placing table can be firmly held together with the paper sheet placing table.

Advantageous Effects

The present invention provides a paper sheet storage container capable of accurately taking out paper sheets (for example, separator cards) one-by-one with a simple mechanism.

DESCRIPTION OF THE PREFERRED EMBODIMENTS

First Embodiment

A first embodiment will now be described with reference to the drawings.

1.1: Configuration of Paper Sheet Storage Container

Figure 1:
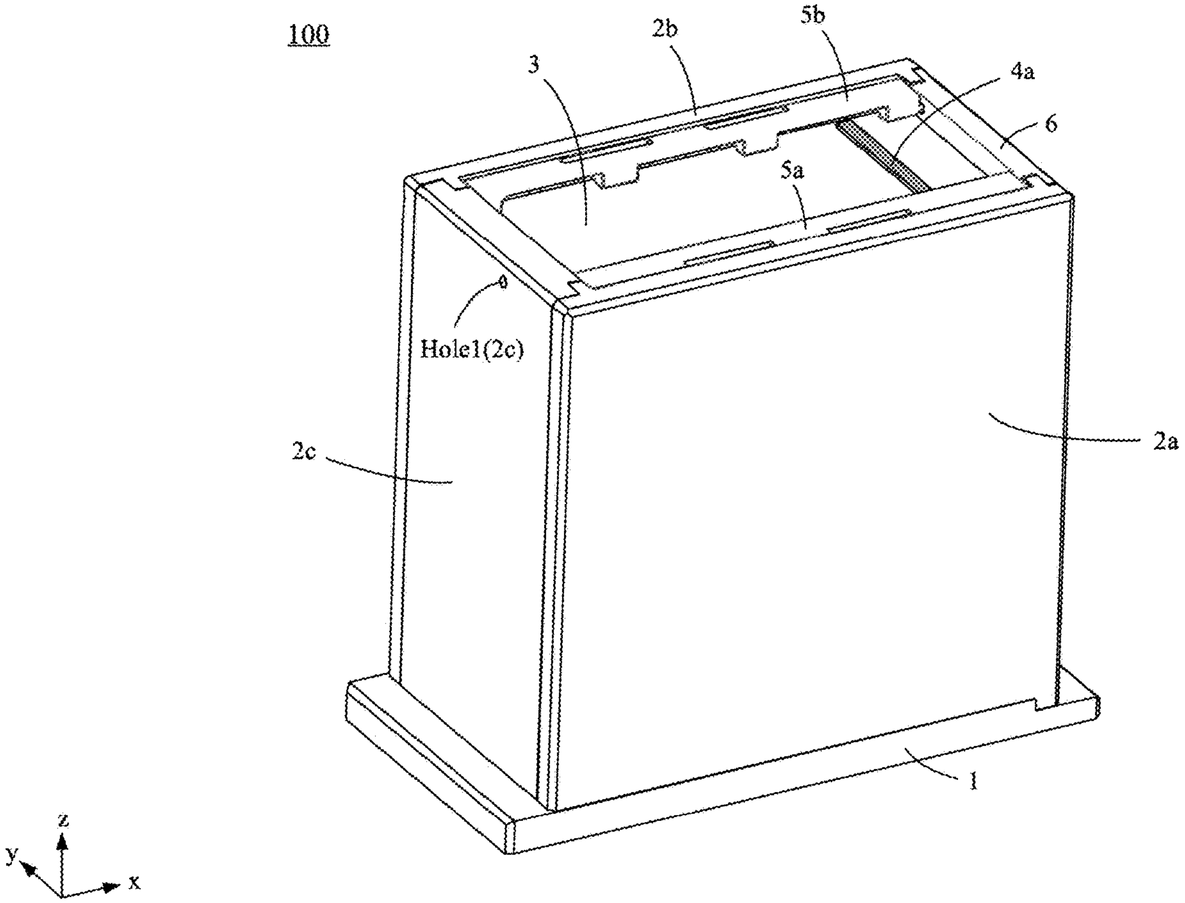
FIG. 1 is a diagram (perspective view) showing an external appearance of a paper sheet storage container 100 according to a first embodiment.

FIG. 1 is a diagram (perspective view) showing an external appearance of a paper sheet storage container 100 according to a first embodiment.

Figure 2:
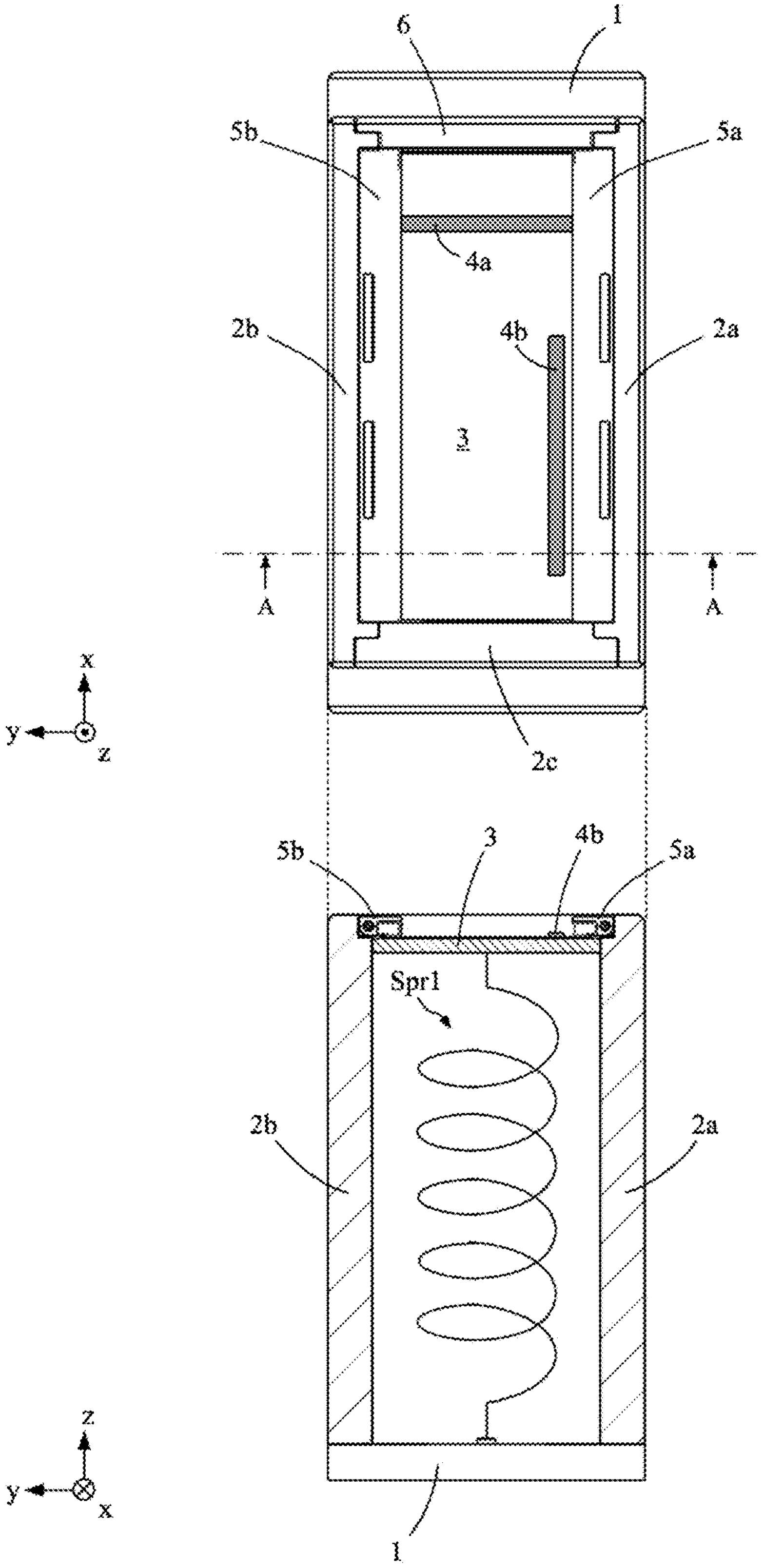
FIG. 2 is a plan view (the upper portion of FIG. 2) and a cross-sectional view (cross-sectional view taken along the A-A line) (the lower portion of FIG. 2) of the paper sheet storage container 100 according to the first embodiment.

FIG. 2 is a plan view (the upper portion of FIG. 2) and a cross-sectional view (cross-sectional view taken along the A-A line) (the lower portion of FIG. 2) of the paper sheet storage container 100 according to the first embodiment.

Figure 3:
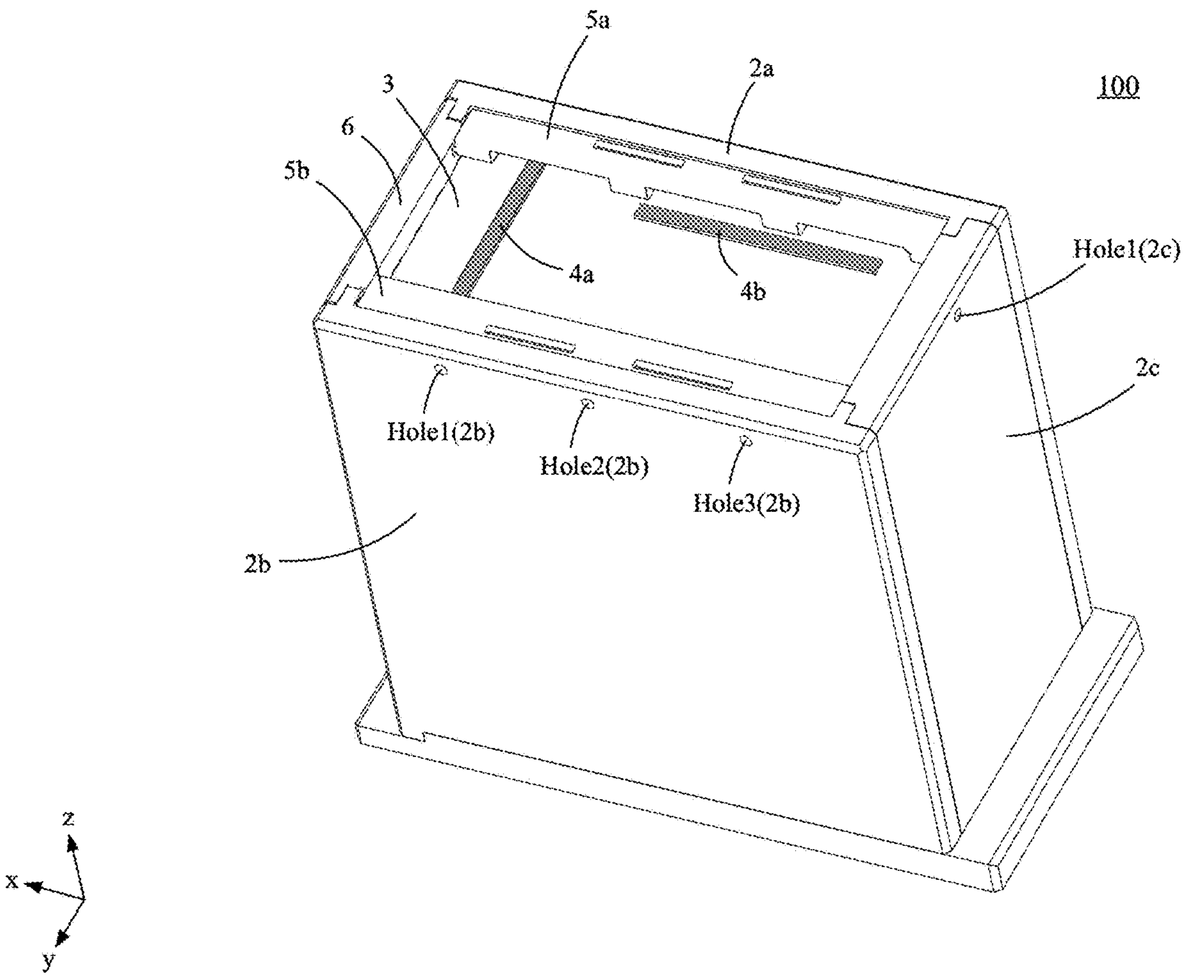
FIG. 3 is a diagram (perspective view) showing an external appearance of the paper sheet storage container 100 according to the first embodiment.

FIG. 3 is a diagram (perspective view) showing an external appearance of the paper sheet storage container 100 according to the first embodiment.

Figure 4:
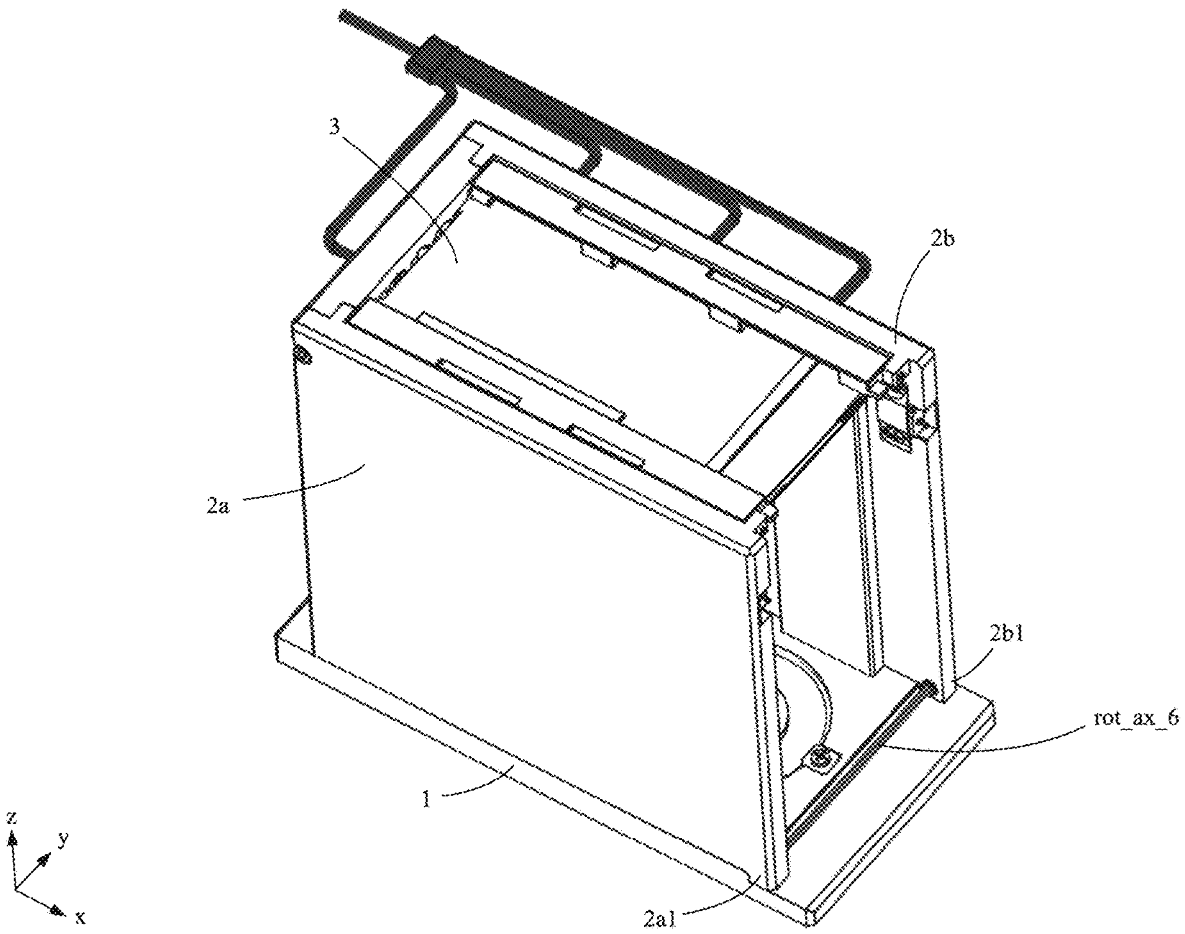
FIG. 4 is a diagram (perspective view) of the paper sheet storage container 100 according to the first embodiment, and is a diagram showing a rotational shaft of a front panel portion 6.

FIG. 4 is a diagram (perspective view) of the paper sheet storage container 100 according to the first embodiment, and is a diagram showing a rotational shaft of a front panel portion 6.

Figure 5:
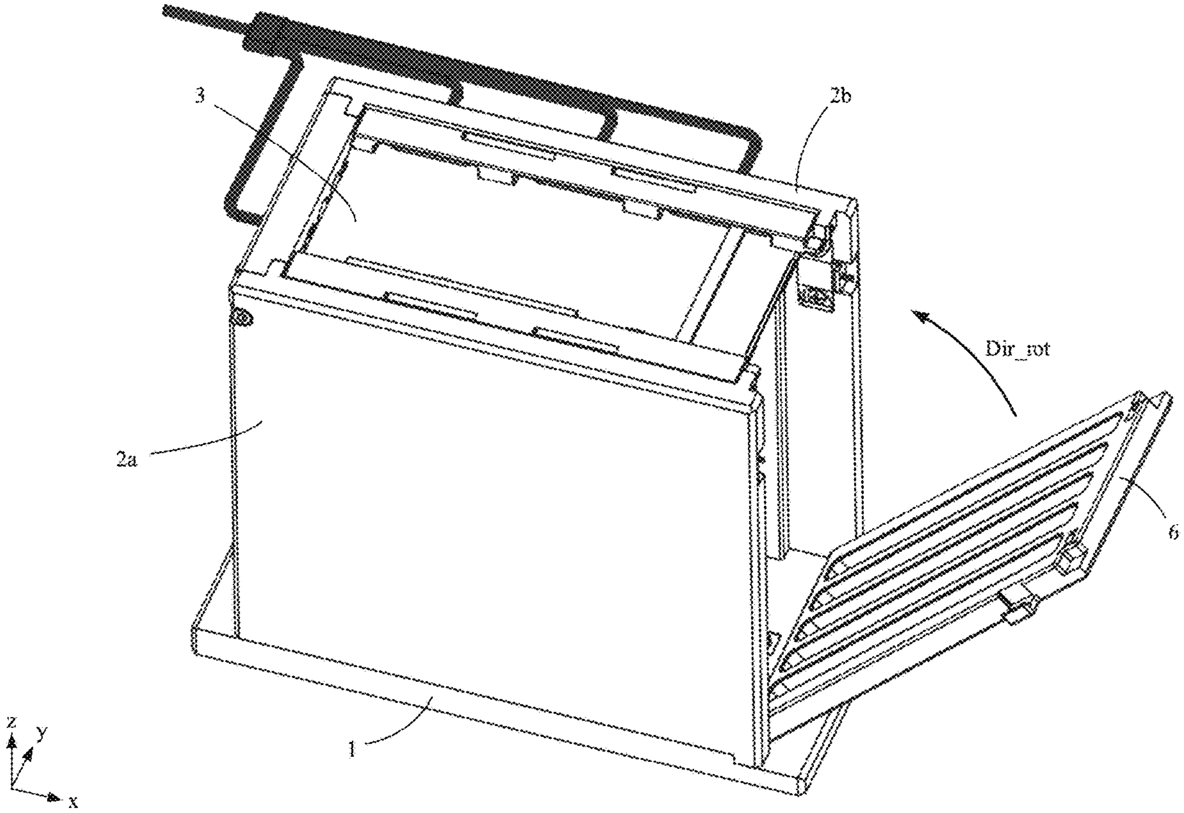
FIG. 5 is a diagram (perspective view) of the paper sheet storage container 100 according to the first embodiment, and is a diagram for explaining a rotation operation (opening and closing operation) of the front panel portion 6.

FIG. 5 is a diagram (perspective view) of the paper sheet storage container 100 according to the first embodiment, and is a diagram for explaining a rotation operation (opening and closing operation) of the front panel portion 6.

Figure 6:
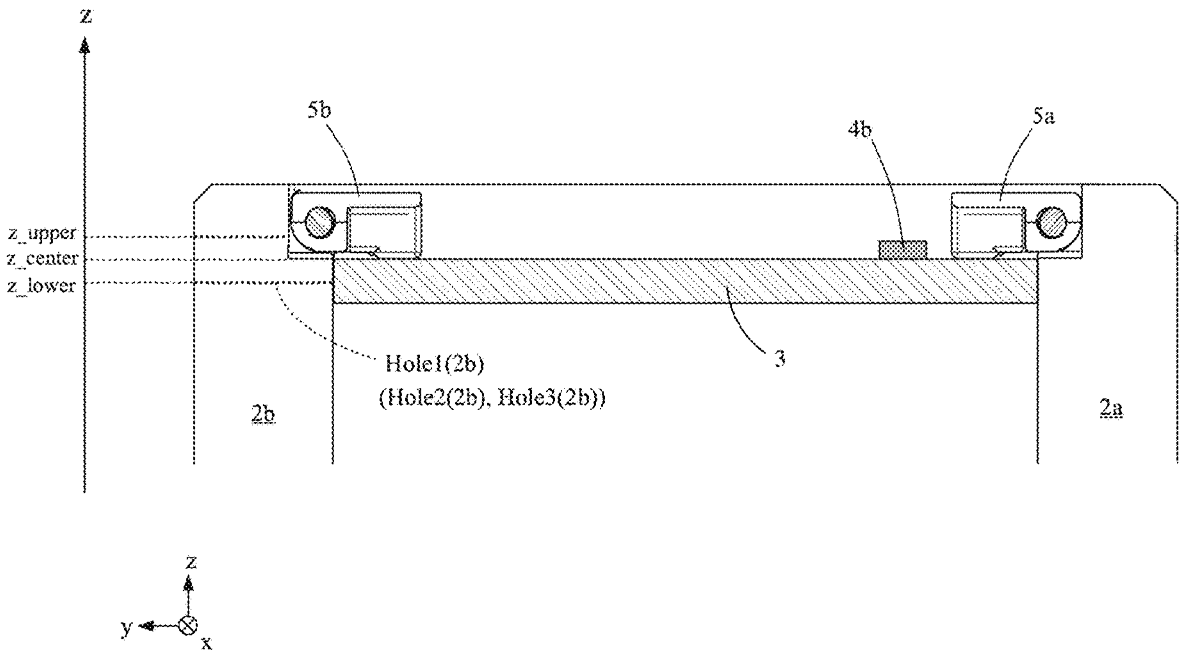
FIG. 6 is a diagram for explaining a positional relationship between holes in the paper sheet storage container 100 according to the first embodiment.

FIG. 6 is a diagram for explaining a positional relationship between holes in the paper sheet storage container 100 according to the first embodiment, and is a diagram showing a partially enlarged cross-sectional view taken along the A-A line in FIG. 2.

Figure 7:
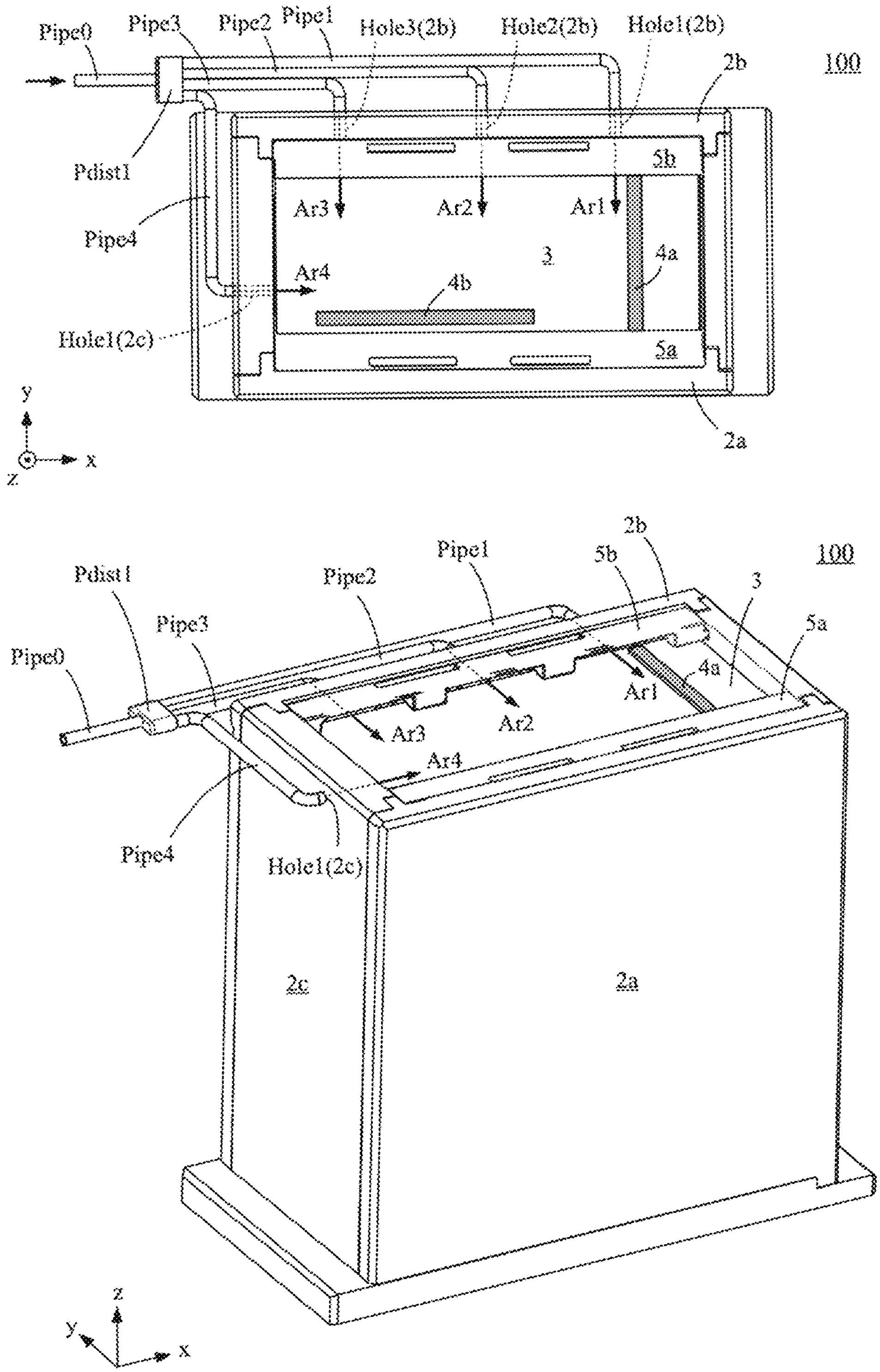
FIG. 7 is a plan view (the upper portion of FIG. 7) and an external view (perspective view) (the lower portion of FIG. 7) of the paper sheet storage container 100 according to the first embodiment, and is a diagram schematically showing flow paths of air flowing into the paper sheet storage container 100.

FIG. 7 is a plan view (the upper portion of FIG. 7) and an external view (perspective view) (the lower portion of FIG. 7) of the paper sheet storage container 100 according to the first embodiment, and is a diagram schematically showing flow paths of air flowing into the paper sheet storage container 100.

Figure 8:
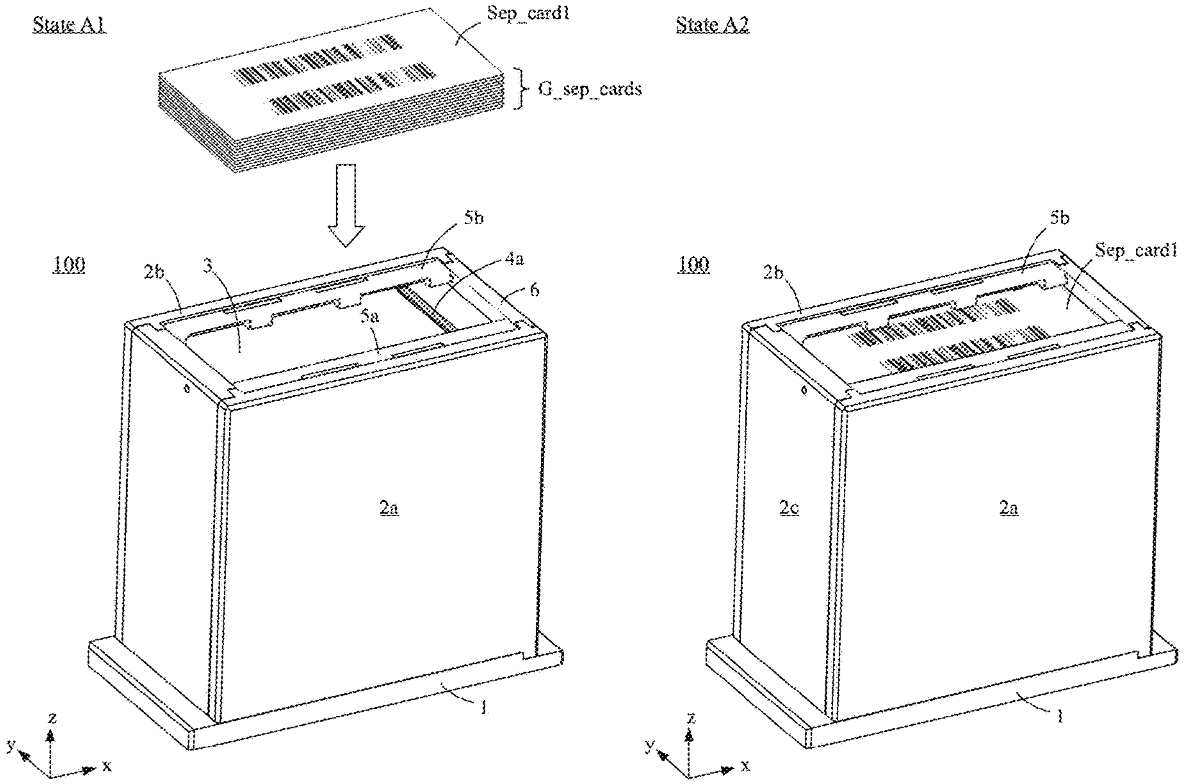
FIG. 8 is a diagram (perspective view) showing an external appearance of the paper sheet storage container 100 according to the first embodiment, and is a diagram for explaining the placing of paper sheets on a paper sheet placing table 3.

FIG. 8 is a diagram (perspective view) showing an external appearance of the paper sheet storage container 100 according to the first embodiment, and is a diagram for explaining the placing of paper sheets on a paper sheet placing table 3.

Figure 9:
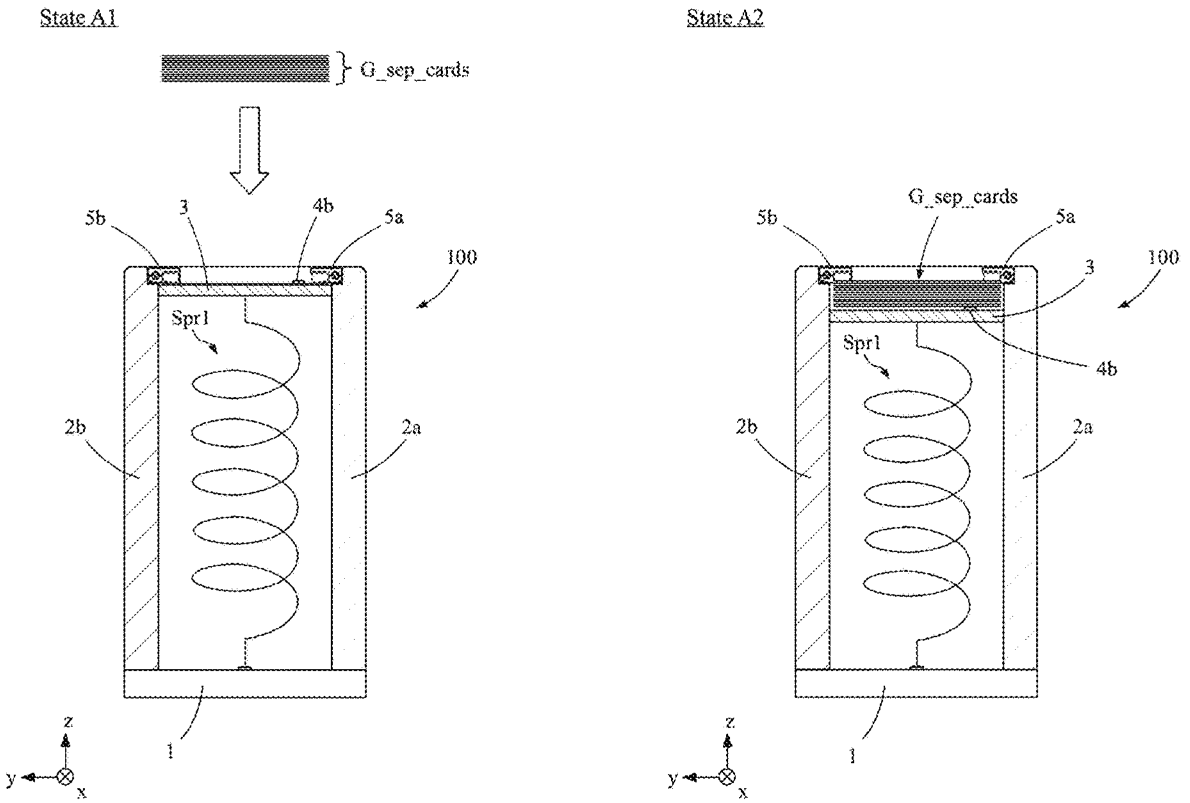
FIG. 9 is a cross-sectional view taken along the A-A line of FIG. 2 of the paper sheet storage container 100 according to the first embodiment, is a diagram for explaining the placing of the paper sheet on the paper sheet placing table 3.

FIG. 9 is a cross-sectional view taken along the A-A line of FIG. 2 of the paper sheet storage container 100 according to the first embodiment, is a diagram for explaining the placing of the paper sheet on the paper sheet placing table 3.

Figure 10:
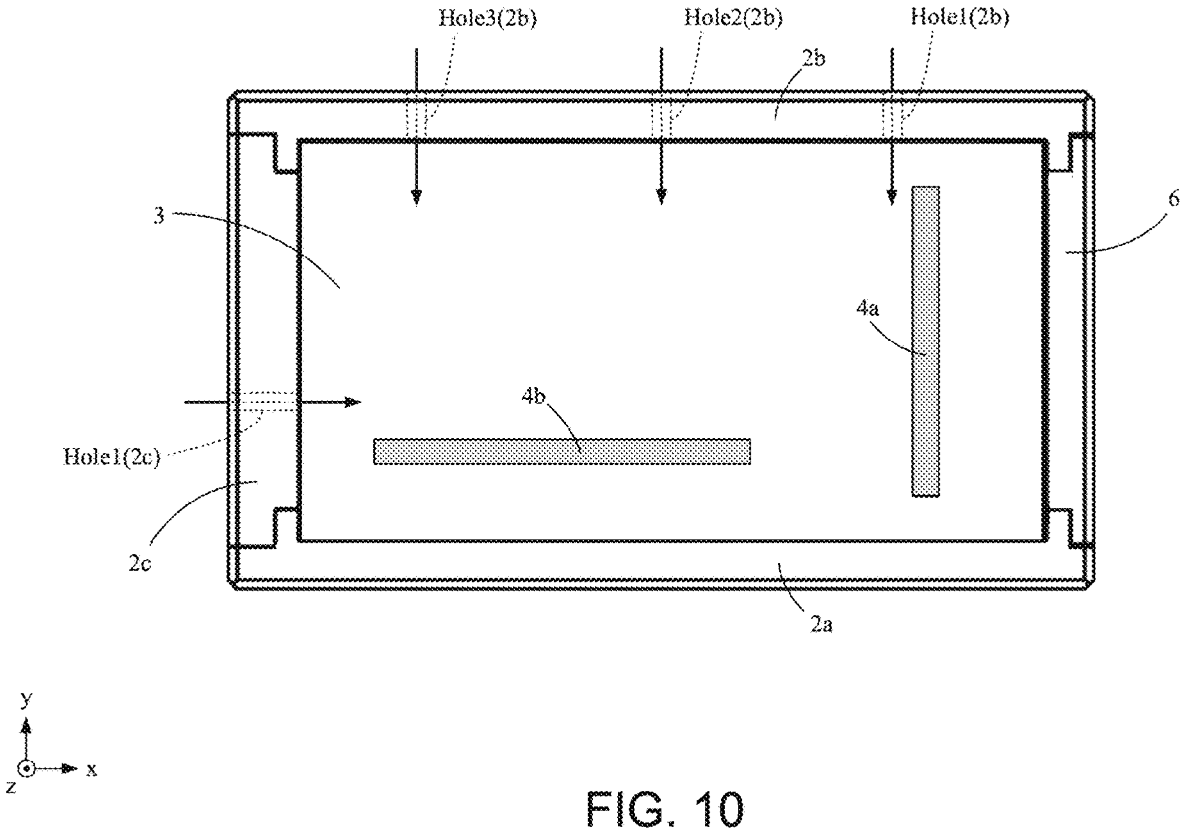
FIG. 10 is a plan view of the paper sheet storage container 100 according to the first embodiment, and is a diagram for explaining air flow path regulation.

FIG. 10 is a plan view of the paper sheet storage container 100 according to the first embodiment, and is a diagram for explaining air flow path regulation.

Figure 11:
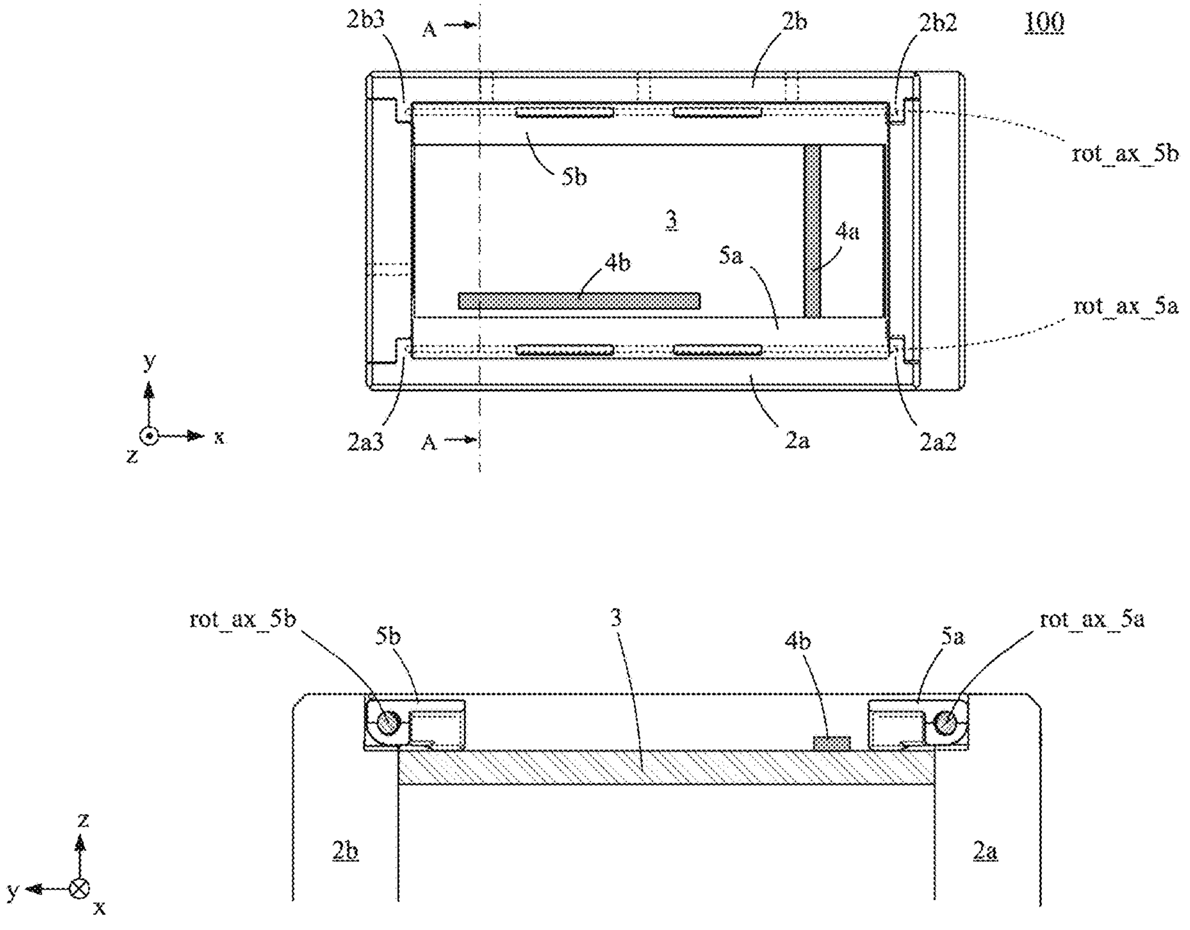
FIG. 11 is a plan view of the paper sheet storage container 100 according to the first embodiment and a partially enlarged cross-sectional view taken along the A-A line in FIG. 2, and is a diagram for explaining a configuration of a first flap portion 5*a* and a second flap portion 5*b*.

FIG. 11 is a plan view of the paper sheet storage container 100 according to the first embodiment and a partially enlarged cross-sectional view taken along the A-A line in FIG. 2, and is a diagram for explaining a configuration of a first flap portion 5*a* and a second flap portion 5*b*.

Figure 12:
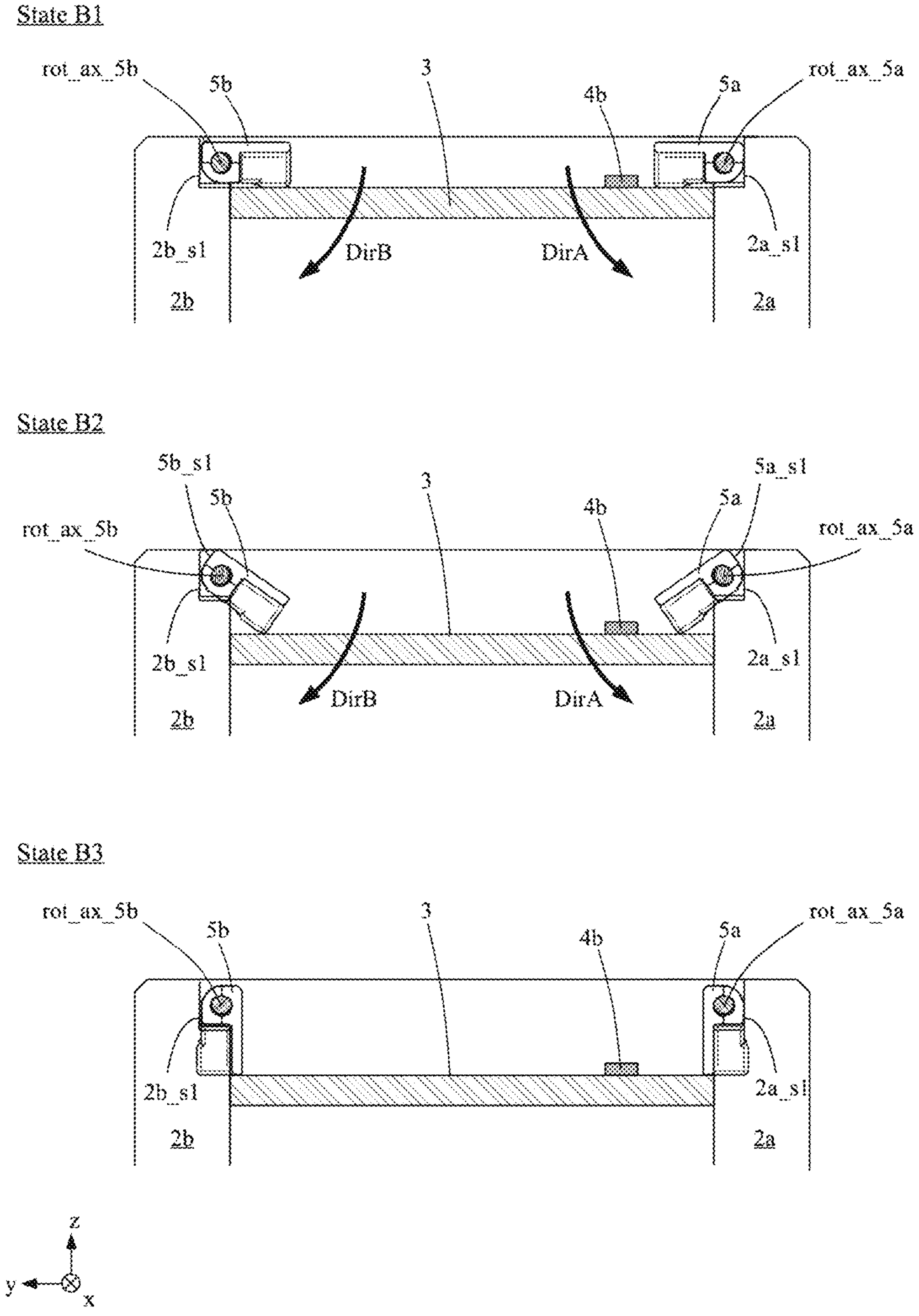
FIG. 12 is a diagram showing a partially enlarged cross-sectional view taken along the A-A line in FIG. 2 of the paper sheet storage container 100 according to the first embodiment, and is a diagram for explaining the configuration of the first flap portion 5*a* and the second flap portion 5*b*.

FIG. 12 is a diagram showing a partially enlarged cross-sectional view taken along the A-A line in FIG. 2 of the paper sheet storage container 100 according to the first embodiment, and is a diagram for explaining the configuration of the first flap portion 5*a* and the second flap portion 5*b*.

Figure 13:
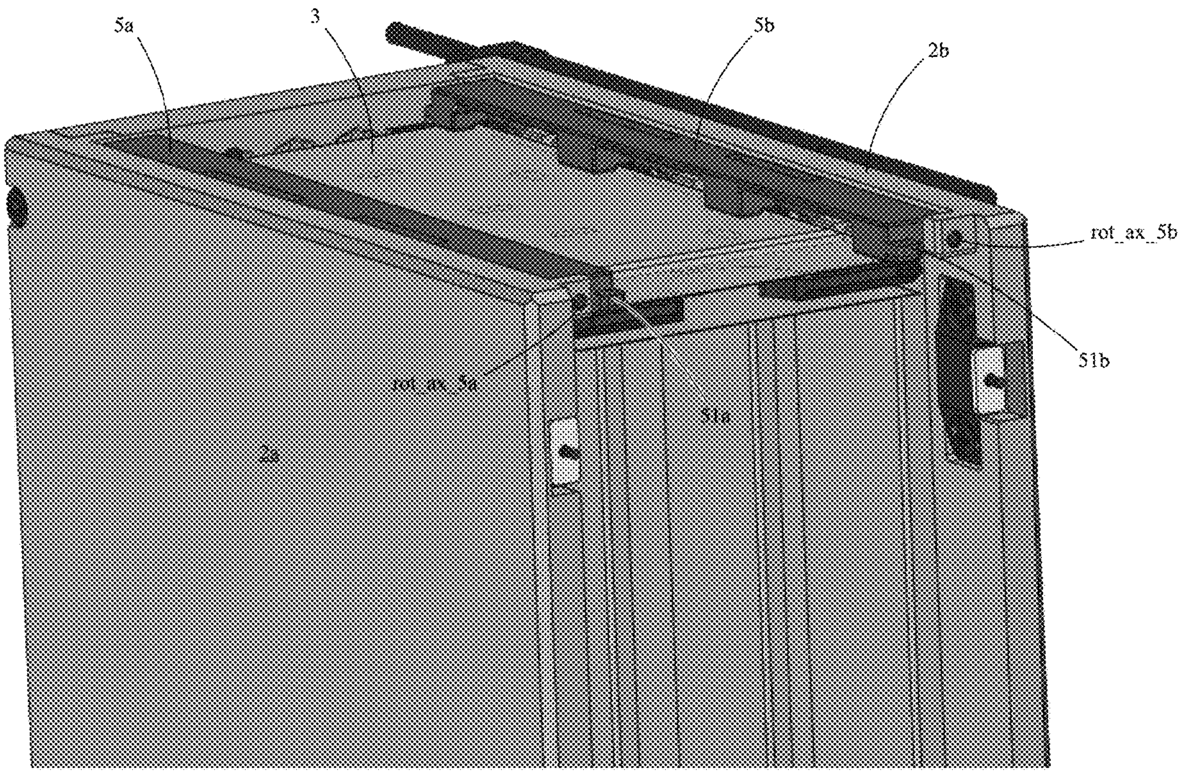
FIG. 13 is a partially enlarged perspective view of the paper sheet storage container 100 according to the first embodiment, and is a diagram for explaining the configuration of the first flap portion 5*a* and the second flap portion 5*b*.

FIG. 13 is a partially enlarged perspective view of the paper sheet storage container 100 according to the first embodiment, and is a diagram for explaining the configuration of the first flap portion 5*a* and the second flap portion 5*b*.

Figure 14:
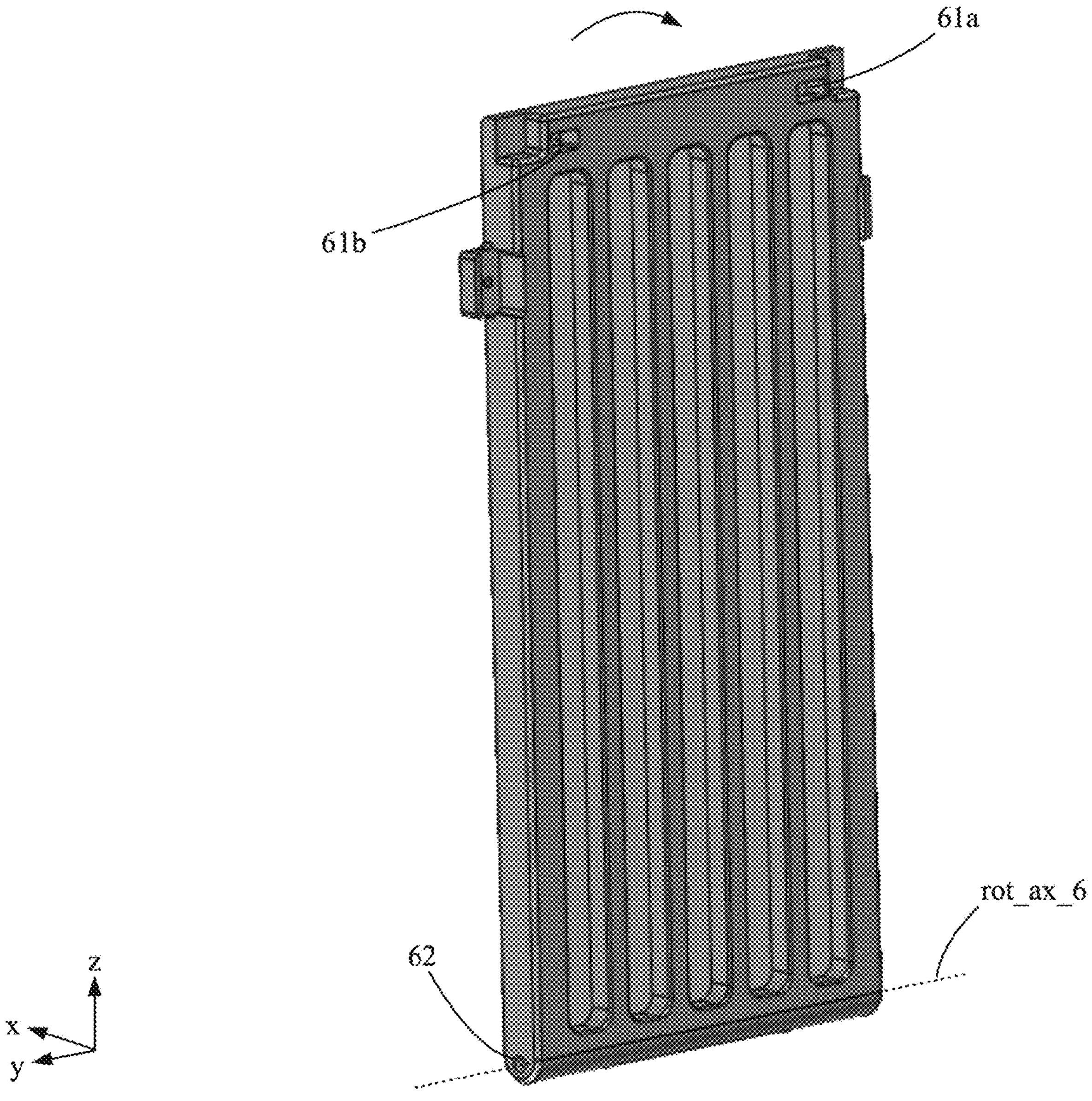
FIG. 14 is a diagram (perspective view) showing an external appearance of a front panel portion 6 of the paper sheet storage container 100 according to the first embodiment.

FIG. 14 is a diagram (perspective view) showing an external appearance of a front panel portion 6 of the paper sheet storage container 100 according to the first embodiment.

The x-axis, the y-axis, and the z-axis are set as shown in FIGS. 1 to 14.

Figure 24:
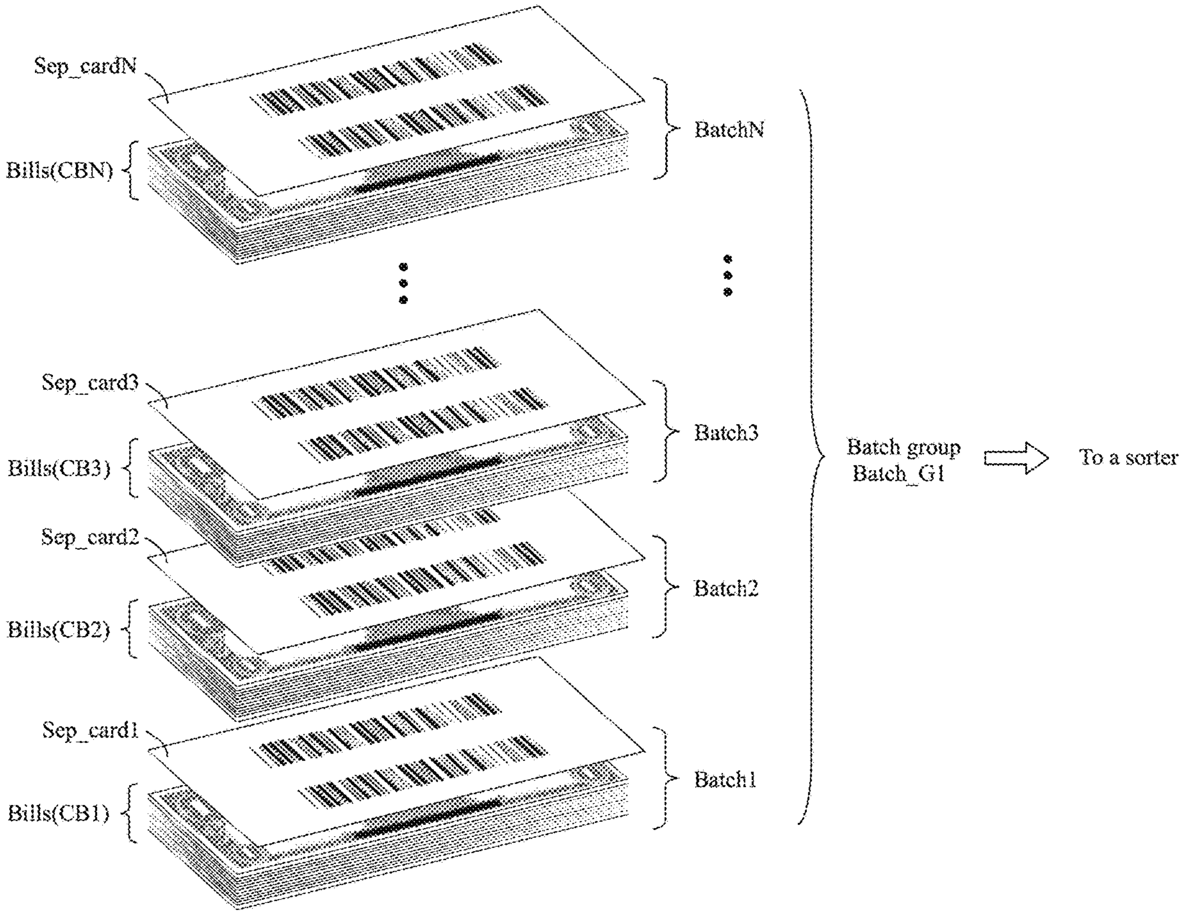
FIG. 24 is a diagram for explaining a bill bundle, a separator card, a batch, and a batch group.

The paper sheet storage container 100 is, for example, a container for storing paper sheets (for example, separator cards Sep_card1 to Sep_cardN in FIG. 24) used when a bill processing system ties up (stacks) bill bundles collected from a plurality of cash boxes to create a batch (bill bundle group).

As shown in FIG. 1, the paper sheet storage container 100 includes a bottom portion 1, a side wall portion 2, a paper sheet placing table 3, a first flow path regulating portion 4*a* (flow path restricting member), a second flow path regulating portion 4*b* (flow path restricting member), a first flap portion 5*a* (holding member), a second flap portion 5*b* (holding member), and a front panel portion 6 that is installed so as to be freely opened and closed.

As shown in FIG. 2, the paper sheet storage container 100 includes an elastic member Spr1 disposed between the bottom portion 1 and the paper sheet placing table 3.

The bottom portion 1 is, for example, a rectangular flat plate-like member, and is a member for supporting the side wall portion 2 while enabling the paper sheet storage container 100 to be installed on a flat floor or a desk. The bottom portion 1 is a member for supporting the elastic member Spr1 on the upper surface thereof. The bottom portion 1, together with the side wall portion 2 and the front panel portion 6 (the front panel portion 6 in a closed state), secures a space for storing paper sheets in a state in which the paper sheets have been placed on the paper sheet placing table 3.

The side wall portion 2 is formed of, for example, a rectangular flat plate-like member. The side wall portion 2 includes a first sidewall portion 2*a*, a second sidewall portion 2*b*, and a third side wall portion 2*c*. As shown in FIG. 1, the side wall portion 2 (the first side wall portion 2*a*, the second side wall portion 2*b*, and the third side wall portion 2*c*) is installed so as to extend in the vertical direction (the positive z-axis direction in FIG. 1) at the peripheral edge portion of the bottom portion 1. This allows the side wall portion 2, together with the bottom portion 1 and the front panel portion 6 (the front panel portion 6 in a closed state), to secure a space for storing the paper sheets in a state in which the paper sheets have been placed on the paper sheet placing table 3. As shown in FIG. 4, the first side wall portion 2*a* has a rotational shaft support portion 2*a*1 for supporting a rotational shaft rot_ax_6 for rotating the front panel portion 6 to open and close it; the second side wall portion 2*b* has a rotational shaft support portion 2*b*1 for supporting the rotational shaft rot_ax_6 for rotating the front panel portion 6 to open and close it. This allows the front panel portion 6 to be rotatably installed around the rotational shaft rot_ax_6, thus allowing for installing the front panel so as to be freely opened and closed, as shown in FIG. 5. When the front panel portion 6 is set to be closed, the front panel portion 6 can be maintained closed by a predetermined lock mechanism. For example, a magnet and a metal plate each provided at the corresponding positions of the side wall portion 2 and the front panel portion 6 are attached to each other to maintain a state in which the front panel is in contact with the side wall portion 2 (a state in which the metal plate is attracted to the magnet), thereby bringing the front panel portion 6 into a closed state.

As shown in FIGS. 1, 2, and 3, the side wall portion 2 is provided with holes for allowing air to flow from the outside to the inside of the paper sheet storage container 100 in the vicinity of the upper portion. Specifically, as shown in FIGS. 1, 2, and 3, the second side wall portion 2*b* has three holes Hole1(2*b*), Hole2(2*b*), and Hole3(2*b*) near the upper portion thereof; the third side wall portion 2*c* has one hole Hole1(2*c*) near the upper portion thereof.

As shown in FIG. 6, each of the three holes Hole1(2*b*), Hole2(2*b*) and Hole3(2*b*) has a cylindrical shape, and is formed in the second side wall portion 2*b* such that the height of the central axis of each of the holes, that is, the z-coordinate value z_center, is substantially the same. Furthermore, as shown in FIG. 6, the three holes Hole1(2*b*), Hole2(2*b*) and Hole3(2*b*) are formed such that the position of the central axis (the z-coordinate value z_center) thereof is substantially the same (substantially the same height) as the position of the upper surface of the paper sheet placing table 3 when no paper sheet is placed on the paper sheet placing table 3.

The hole Hole1(2*c*) has a cylindrical shape, and is formed in the third side wall portion 2*c* such that the height of the central axis (z-coordinate value z_center) of the hole Hole1 (2*c*) is substantially the same height (substantially the same z-coordinate value) as those of the hole Hole1(2*b*), Hole2 (2*b*) and Hole3(2*b*); and the cross-section orthogonal to the central axis of the hole Hole1(2*c*) is substantially the same shape as the cross-sections of the hole Hole1(2*b*), Hole2(2*b*) and Hole3(2*b*), which are each orthogonal to their central axes. The hole Hole1(2*c*) is formed such that the position of the center axis (z-coordinate value z_center) thereof is substantially the same (substantially the same height) as the position of the upper surface of the paper sheet placing table 3 in a state when no paper sheet is placed on the paper sheet placing table 3.

Note that the first flow path regulating portion 4*a* and the second flow path regulating portion 4*b* are installed on the paper sheet placing table 3 so that the position (z-coordinate value) of the upper surface of the second flow path regulating portion 4*b* is substantially the same as the position (z-coordinate value) of the upper surface of the first flow path regulating portion 4*a* in a state where no paper sheet is placed on the paper sheet placing table 3.

Further, for example, as shown in FIG. 7, pipes (for example, pipes Pipe1 to Pipe4 in FIG. 7) for allowing air (for example, an airflow) to flow into the inside of the paper sheet storage container 100 are connected to the holes Hole1(2*b*), Hole2(2*b*), Hole3(2*b*), and Hole1(2*c*) of the side wall portion 2. Air from the pipes (for example, the pipes Pipe1 to Pipe4 in FIG. 7) are then introduced into the inside of the paper sheet storage container 100 through the holes Hole1 (2*b*), Hole2(2*b*), Hole3(2*b*), and Hole1(2*c*) of the side wall portion 2. For example, the pipes (for example, the pipes Pipe1 to Pipe4 in FIG. 7) for leading air flows into the inside of the paper sheet storage container 100 may be connected to, as shown in FIG. 7, a distributor Pdist1 by which a pipe Pipe0 branches into the pipes Pipe1 to Pipe4; the branched pipes Pipe1 to Pipe4 may be connected to the holes Hole1 (2*b*), Hole2(2*b*), Hole3(2*b*), and Hole1(2*c*), respectively. Further, the pipe Pipe0 may be connected to a pump (not shown), and air may be supplied from the pump to the pipe Pipe0.

As shown in FIG. 11, the first side wall portion 2*a* has rotational shaft support portions 2*a*2 and 2*a*3 for supporting a rotational shaft rot_ax_5*a* for rotatably supporting the first flap portion 5*a*.

Further, as shown in FIG. 11, the second side wall portion 2*b* has rotational shaft support portions 2*b*2 and 2*b*3 for supporting the rotational shaft rot_ax_5*a* for rotatably supporting the first flap portion 5*a*.

The paper sheet placing table 3 is, for example, a table on which paper sheets (for example, separator cards) are placed in a flat stacking state (a state in which paper sheets are spread) as shown in FIGS. 8 and 9. The paper sheet placing table 3 has substantially the same shape as or substantially a similar shape to the shape of a paper sheet to be placed thereon so that the paper sheet can be placed in a flat stacking state, and has substantially the same size as or larger than that of the sheet. The paper sheet placing table 3 is arranged in a space defined by the bottom portion 1, the side wall portion 2, and the front panel portion 6 (the front panel portion 6 in a closed state). The lower surface of the paper sheet placing table 3 is connected to the other end of the elastic member Spr1 having one end installed on the bottom portion 1, as shown in the lower portion of FIG. 2. The paper sheet placing table 3 is biased upward (in the positive z-axis direction) by the elastic member Spr1, thereby allowing the paper sheet placing table 3 to hold an object (for example, paper sheets) placed on the paper sheet placing table 3 together with the first flap portion 5*a* and the second flap portion 5*b* (for example, refer to FIGS. 8 and 9).

As shown in FIG. 10, the first flow path regulating portion 4*a* and the second flow path regulating portion 4*b* are provided on the surface of the paper sheet placing table 3 on which the paper sheet is to be placed.

As shown in FIGS. 1 to 10, the first flow path regulating portion 4*a* is an elongated flat plate-shaped member, and is installed on the upper surface of the paper sheet placing table 3. The first flow path regulating portion 4*a* is a member for regulating flow directions of the air (e.g., airflow) flowing into the inside of the paper sheet storage container 100 from the outside through the holes Hole1(2*b*), Hole2(2*b*), Hole3 (2*b*), and Hole1(2*c*) of the side wall portion 2.

As shown in FIGS. 1 to 10, the second flow path regulating portion 4*b* is an elongated flat plate-shaped member, and is installed on the upper surface of the paper sheet placing table 3. The second flow path regulating portion 4*b* is a member for regulating flow directions of the air (e.g., airflow) flowing into the inside of the paper sheet storage container 100 from the outside through the holes Hole1(2*b*), Hole2(2*b*), Hole3(2*b*), and Hole1(2*c*) of the side wall portion 2.

It is preferable that the first flow path regulating portion 4*a* and the second flow path regulating portion 4*b* are arranged at positions such that the flow rate to the vicinity of the center of the upper surface of the paper sheet placing table 3 increases when air flows into the inside of the paper sheet storage container 100 from the outside. For example, in a case where the holes Hole1(2*b*), Hole2(2*b*), Hole3(2*b*), and Hole1(2*c*) of the side wall portion 2 are arranged as shown in FIG. 10, the first flow path regulating portion 4*a* is preferably installed so that the position of the first flow path regulating portion 4*a* is closer to the front panel portion 6 than the position of the hole Hole1(2*b*) in the x-axis direction. In addition, in the above-described case, it is preferable that the second flow path regulating portion 4*b* is installed such that the position of the second flow path regulating portion 4*b* is closer to the first side wall portion 2*a* than the position of the hole Hole1(2*c*) in the y-axis direction.

Arranging the first flow path regulating portion 4*a* and the second flow path regulating portion 4*b* as described above makes it possible to reliably take out the paper sheets one-by-one from the paper sheet storage container 100 even when the number of remaining paper sheets placed on the paper sheet placing table 3 is one to several. When the number of remaining paper sheets placed on the paper sheet placing table 3 is one to several, the flow rate of air flowing into the inside of the paper sheet storage container 100 increases near the center of the lower surface of the remaining one to several paper sheets placed on the paper sheet placing table due to the first flow path regulating portion 4*a* and the second flow path regulating portion 4*b*. This causes a state in which the vicinity of the center of the remaining one to several paper sheets placed on the paper sheet placing table 3 has been raised.

In this state, for example, an adsorption device absorbs the paper sheets, thereby allowing for taking out the paper sheets one-by-one from the paper sheet storage container 100.

In other words, arranging the first flow path regulating portion 4*a* and the second flow path regulating portion 4*b* as described above in the paper sheet storage container 100 makes it possible to reliably take out the paper sheets one-by-one even when the number of the remaining paper sheets placed on the paper sheet placing table 3 is one to several.

As shown in FIG. 11, the first flap portion 5*a* has a substantially rectangular shape in a plan view, and is disposed along an inner wall of the first side wall portion 2*a* at an upper end portion of the first side wall portion 2*a*. As shown in FIGS. 11 and 12, the first flap portion 5*a* is rotatably installed around the rotational shaft rot_ax_5*a* supported by the rotational shaft support portions 2*a*2 and 2*a*3 of the first side wall portion 2*a*. For example, a helical spring (not shown) is installed in the first flap portion 5*a* or the rotational shaft rot_ax_5*a*, and applying a force in the rotational direction DirA of FIG. 12 by the helical spring generates an elastic force in a direction (a direction opposite to the rotational direction DirA) in which the force applied by the helical spring is repelled. As a result, the first flap portion 5*a* returns to the state B1 of FIG. 12 when the force is released after the force is applied to the rotational DirA. As shown in FIG. 12, contacting the surface 5_a__s1 of the first flap portion 5_a_ with the surface 2_a__s1 of the first side wall portion 2_a_ restricts the rotation of the first flap portion 5_a_ (rotation by the elastic force of the helical spring), thereby causing the first flap portion 5_a_ to be maintained in the state B1.

As shown in FIG. 13, the first flap portion 5_a_ has a locking protrusion 51_a_ for locking the first flap portion 5_a_ so as not to rotate in a state where the front panel portion 6 has been closed.

As shown in FIG. 11, the second flap portion 5_b_ has a substantially rectangular shape in a plan view, and is disposed along an inner wall of the second side wall portion 2_b_ at an upper end portion of the second side wall portion 2_b_. As shown in FIGS. 11 and 12, the second flap portion 5_b_ is rotatably installed around the rotational shaft rot_ax_5_b_ supported by the rotational shaft support portions 2_b_2 and 2_b_3 of the second side wall portion 2_b_. For example, a helical spring (not shown) is installed in the second flap portion 5_b_ or the rotational shaft rot_ax_5_b_, and applying a force in the rotation direction DirB in FIG. 12 by the helical spring generates an elastic force in a direction (a direction opposite to the rotation direction DirB) in which the force applied by the helical spring is repelled. As a result, the second flap portion 5_b_ returns to the state B1 of FIG. 12 when the force is released after the force is applied to the rotational DirB. As shown in FIG. 12, contacting the surface 5_b__s1 of the second flap portion 5_b_ with the surface 2_a__s2 of the second side wall portion 2_b_ restricts the rotation of the second flap portion 5_b_ (rotation by the elastic force of the helical spring), thereby causing the second flap portion 5_b_ to be maintained in the state B1.

As shown in FIG. 13, the second flap portion 5_b_ has a locking protrusion 51_b_ for locking the second flap portion 5_b_ so as not to rotate in a state where the front panel portion 6 has been closed.

As shown in FIG. 14, the front panel portion 6 includes a rotational shaft holding portion 62 for installation in a state of passing through the rotational shaft, a locking recess 61_a_ for locking the first flap portion 5_a_ so as not to rotate in a state where the front panel portion 6 has been closed, and a locking recess 61_b_ for locking the second flap portion 5_b_ so as not to rotate in a state where the front panel portion 6 has been closed.

The locking recess 61_a_ is provided at a position where the locking protrusion 51_a_ of the first flap portion 5_a_ is accommodated in a state where the front panel portion 6 has been closed.

The locking recess 61_b_ is provided at a position where the locking protrusion 51_b_ of the second flap portion 5_b_ is accommodated in a state where the front panel portion 6 has been closed.

The elastic member Spr1 is disposed between the upper surface of the bottom portion 1 and the lower surface of the paper sheet placing table 3, and is a member for biasing the paper sheet placing table 3 upward (in the positive z-axis direction). The elastic member Spr1 is provided by using a spring, for example. Note that the elastic member Spr1 may be other than a spring as long as it generates an elastic force.

1.2: Processing (Operation) Using Paper Sheet Container

Processing (operation) using the paper sheet storage container 100 configured as described above will be described with reference to the drawings.

Figure 15:
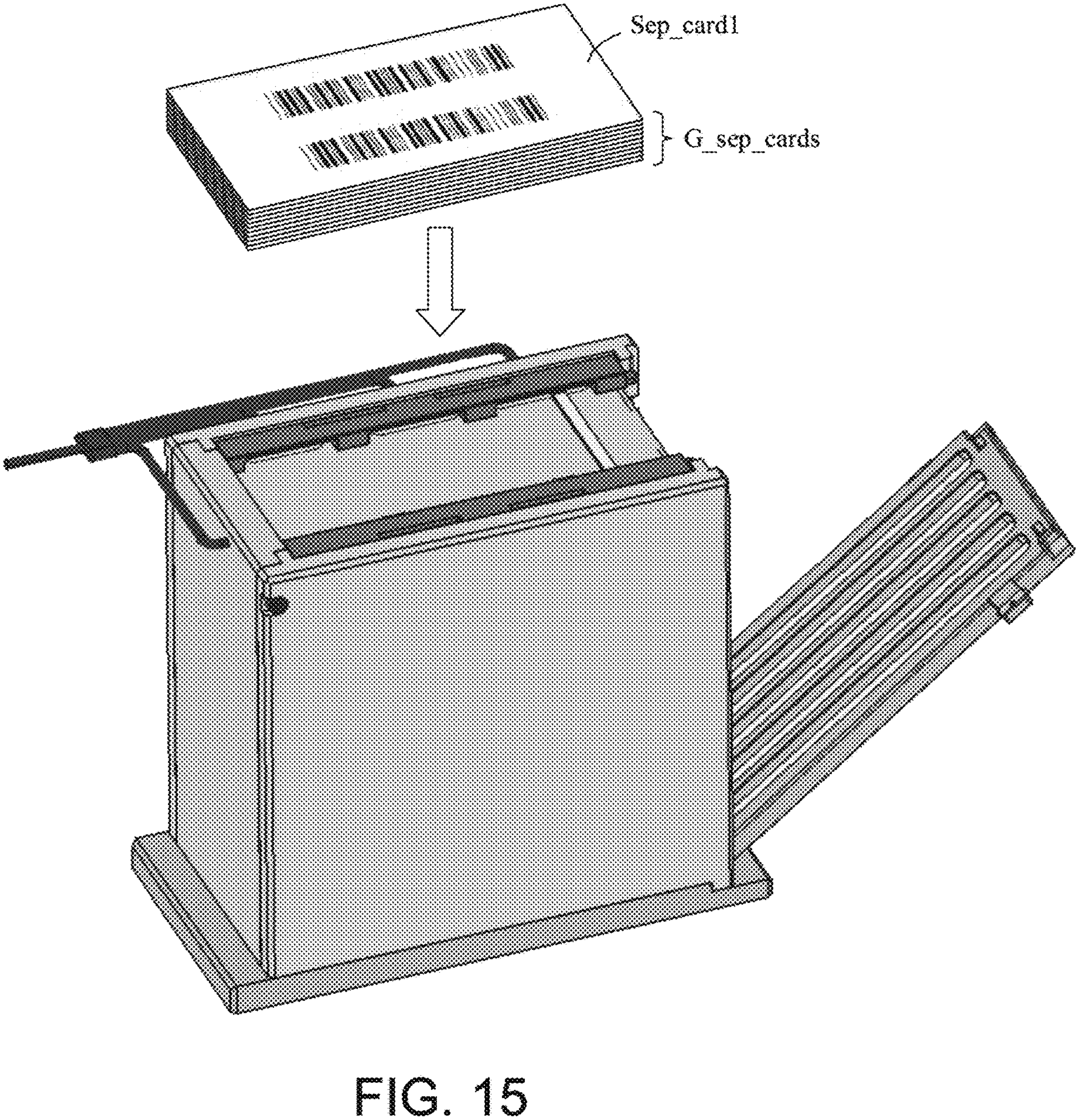
FIG. 15 is a perspective view of the paper sheet storage container 100, and is a diagram for explaining an operation when a bundle G_sep_cards of paper sheets is inserted.

FIG. 15 is a perspective view of the paper sheet storage container 100, and is a diagram for explaining an operation when a bundle G_sep_cards of paper sheets is inserted.

Figure 16:
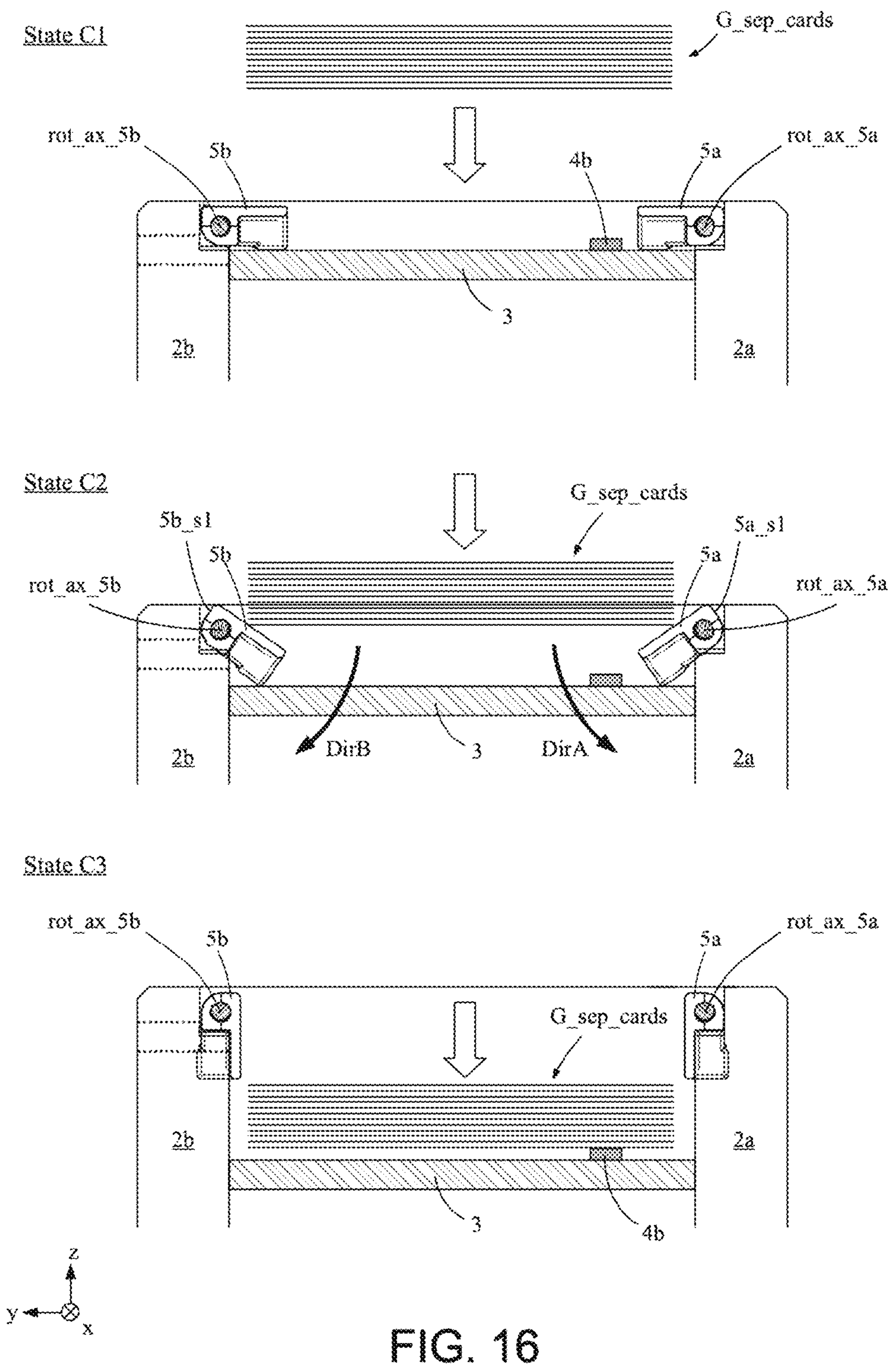
FIG. 16 is a diagram showing a partially enlarged cross-sectional view taken along the A-A line in FIG. 2 of the paper sheet storage container 100, and is a diagram for explaining the operation when the bundle G_sep_cards of the paper sheets is inserted.
Figure 17:
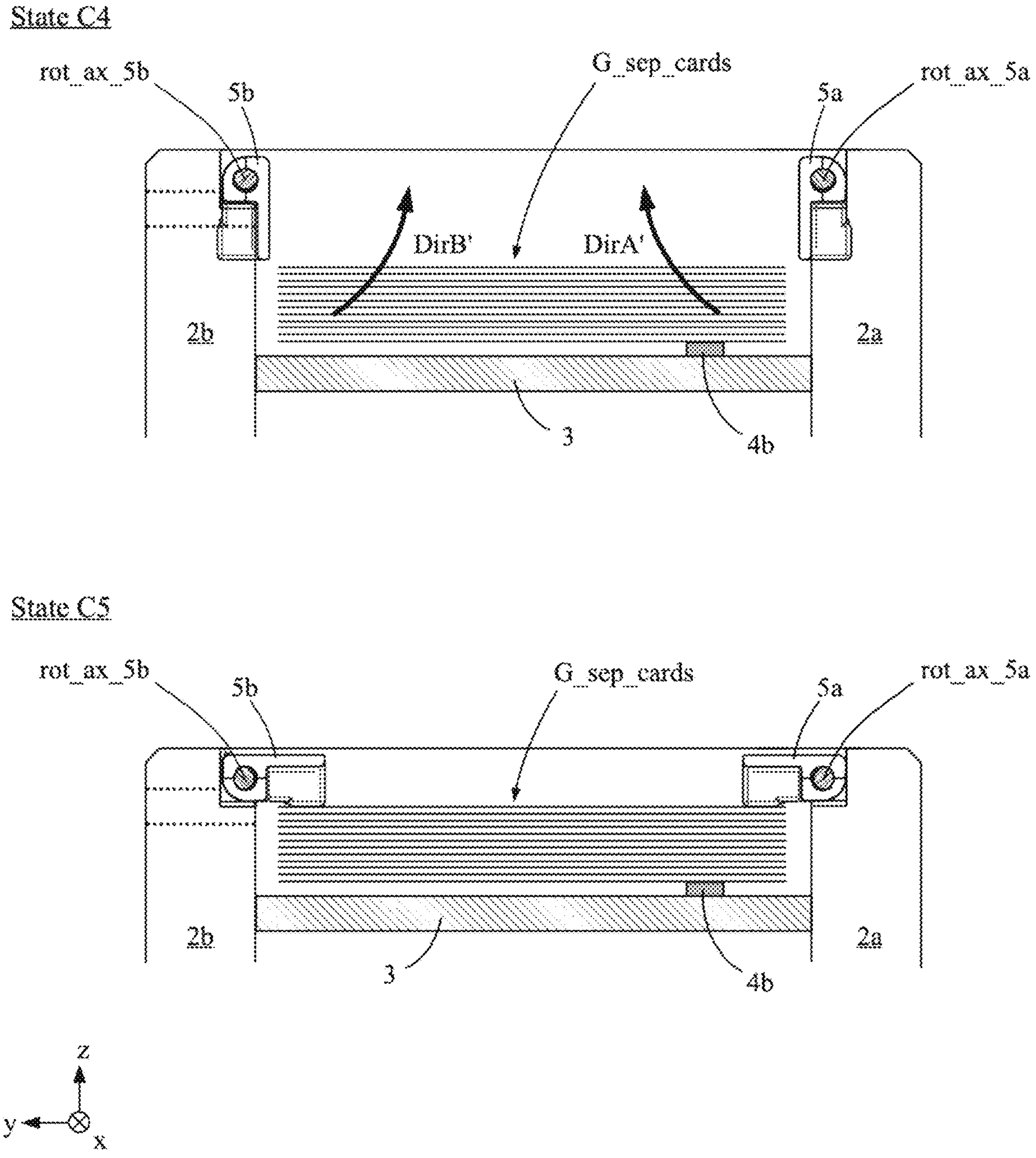
FIG. 17 is a diagram showing a partially enlarged cross-sectional view taken along the A-A line in FIG. 2 of the paper sheet storage container 100, and is a diagram for explaining the operation when the bundle G_sep_cards of the paper sheets is inserted.

FIG. 16 and FIG. 17 are diagrams showing a partially enlarged cross-sectional view taken along the A-A line in FIG. 2 of the paper sheet storage container 100, and are diagrams for explaining the operation when the bundle G_sep_cards of the paper sheets is inserted.

Figure 18:
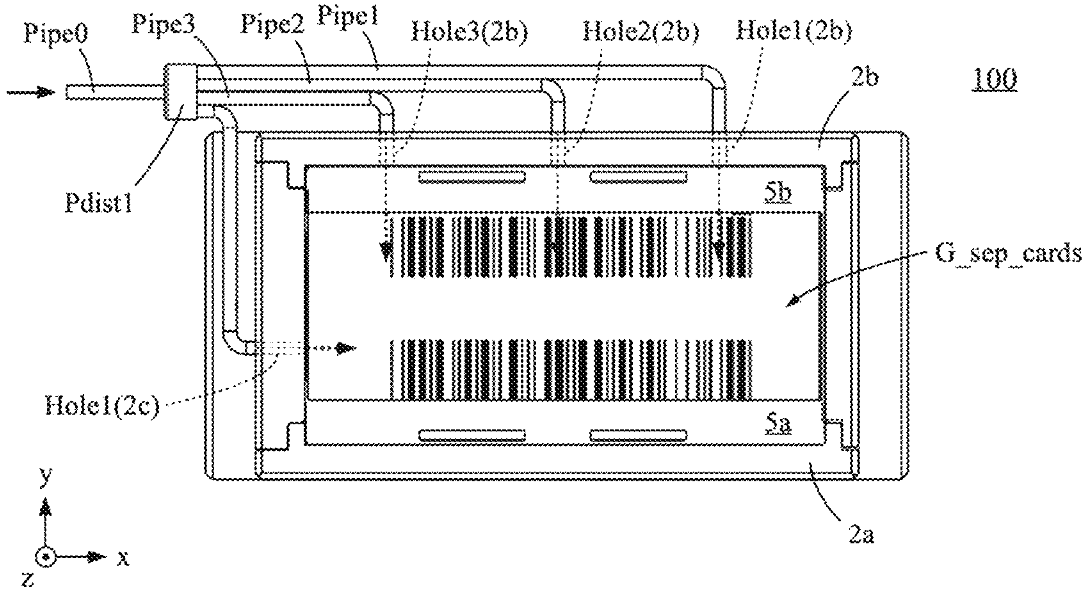
FIG. 18 is a diagram showing a plan view of the paper sheet storage container 100 (the upper portion of FIG. 18) and a partially enlarged cross-sectional view taken along the A-A line in FIG. 2 of the paper sheet storage container 100, and is a diagram for explaining processing for taking out paper sheets.
Figure 18:
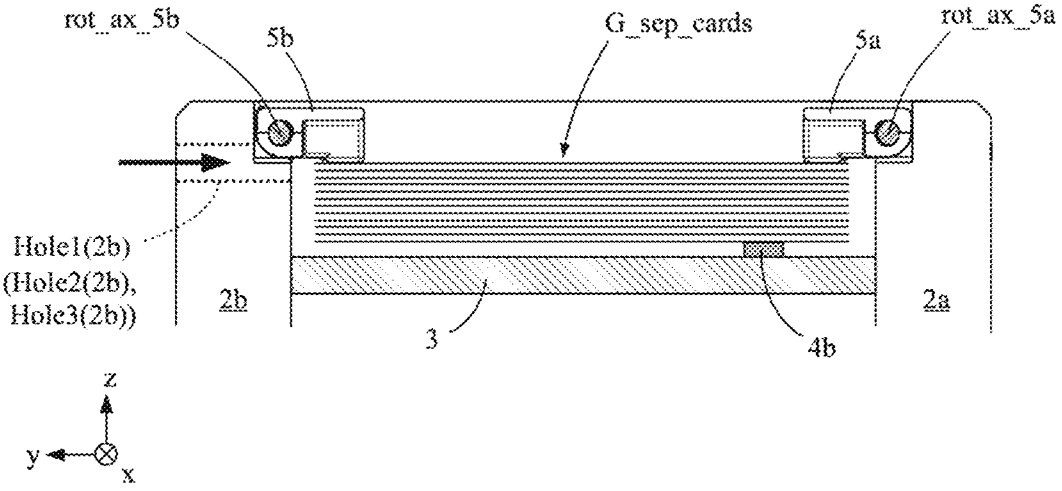

FIG. 18 is a diagram showing a plan view of the paper sheet storage container 100 (the upper portion of FIG. 18) and a partially enlarged cross-sectional view taken along the A-A line in FIG. 2 of the paper sheet storage container 100, and is a diagram for explaining processing for taking out paper sheets.

Figure 19:
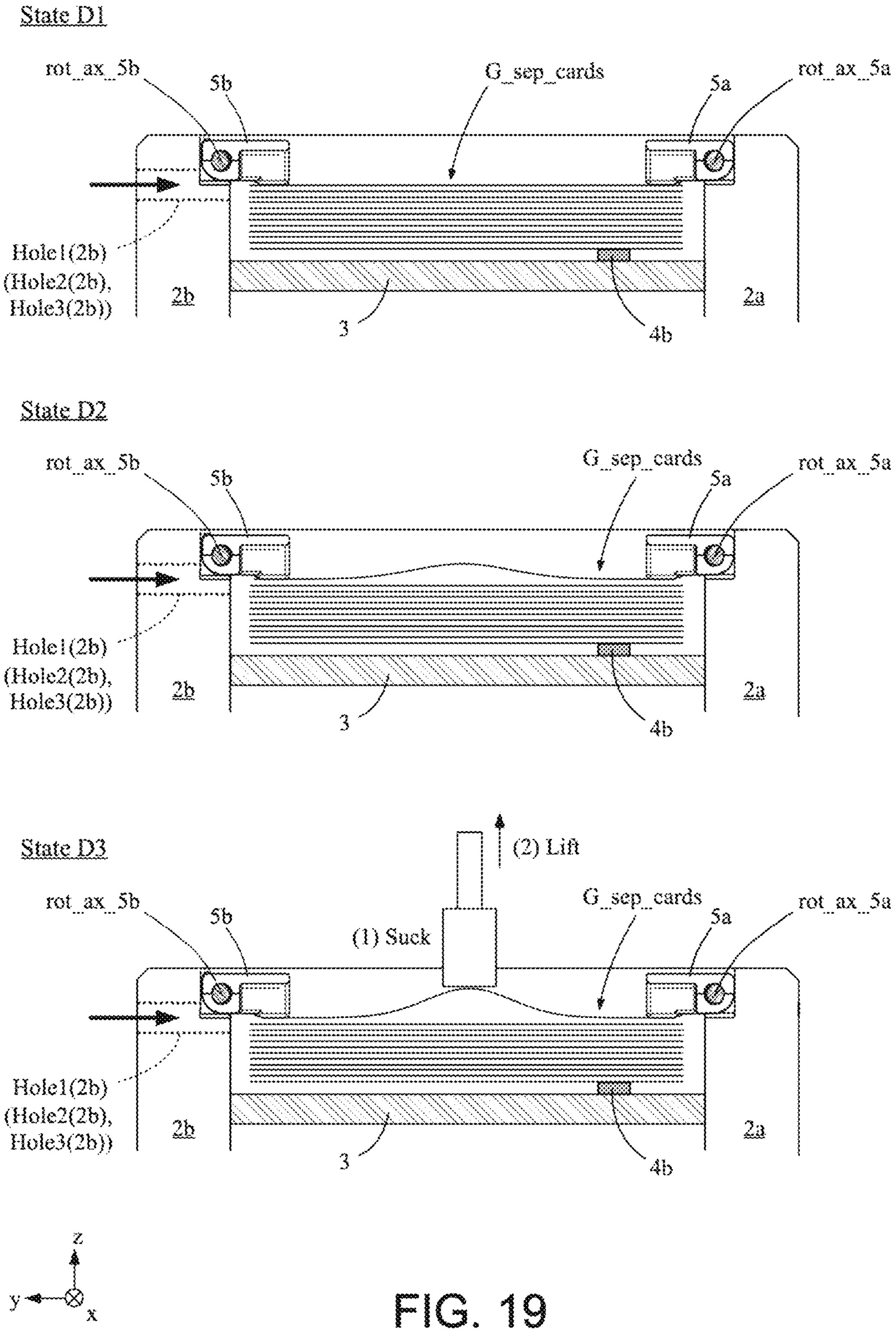
FIG. 19 is a diagram showing a partially enlarged cross-sectional view taken along the A-A line in FIG. 2 of the paper sheet storage container 100, and is a diagram for explaining paper sheet insertion processing.
Figure 20:
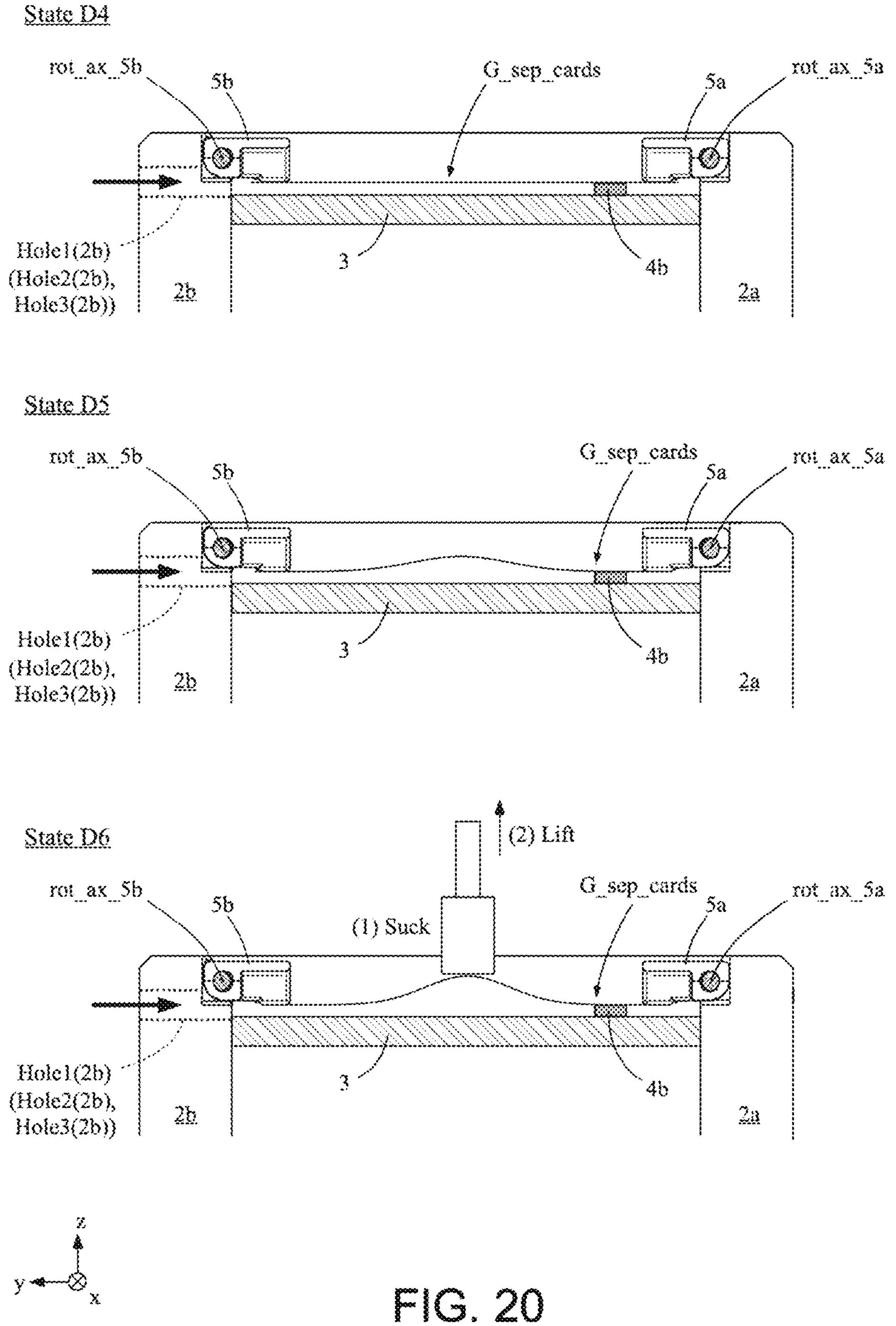
FIG. 20 is a diagram showing a partially enlarged cross-sectional view taken along the A-A line in FIG. 2 of the paper sheet storage container 100, and is a diagram for explaining paper sheet insertion processing.

FIG. 19 and FIG. 20 are diagrams showing a partially enlarged cross-sectional view taken along the A-A line in FIG. 2 of the paper sheet storage container 100, and are diagrams for explaining paper sheet insertion processing.

1.2.1: Unlock Processing

First, in the paper sheet storage container 100, the front panel portion 6 is rotated in a direction opposite to the arrow shown in FIG. 5, for example, so that the front panel portion 6 is opened. In this state, the locking protrusion 51_a_ of the first flap portion 5_a_ and the locking protrusion 5_b_ of the second flap portion 51_b_ are in an open state, and consequently, the first flap portion 5_a_ and the second flap portion 5_b_ are in a state (unlocked state) in which they can be rotated around the rotational shafts rot_ax_5_a_ and rot_ax_5_b_, respectively.

1.2.2: Paper Sheet Insertion Processing

Next, paper sheets are inserted into the paper sheet storage container 100 and are stored in the paper sheet storage container 100. Specifically, as shown in FIG. 15, in a state where the front panel portion 6 has been opened and the first flap portion 5_a_ and the second flap portion 5_b_ have been rotatable, pressing a bundle of paper sheets (the paper sheet group G_sep_cards) against the first flap portion 5_a_ and the second flap portion 5_b_ from above causes the first flap portion 5_a_ and the second flap portion 5_b_ to rotate downward to place the bundle of paper sheets (the paper sheet group G_sep_cards) on the paper sheet placing table 3. This operation is shown in FIGS. 16 and 17.

As shown in FIG. 16, lowering the paper sheet group G_sep_cards downward from above the paper sheet storage container 100 in the unlocked state (state C1 in FIG. 16) causes the end portion of the lowermost paper sheet to be contact with the first flap portion 5_a_ and the second flap portion 5_b_; and then the force applied in the downward direction causes the first flap portion 5_a_ and the second flap portion 5_b_ to rotate around the rotational shafts rot_ax_5_a_ and rot_ax_5_b_ in the rotational directions DirA and DirB direction in FIG. 16, respectively (state C2 in FIG. 16). Further, lowering the paper sheet group G_sep_cards allows the paper sheet group G_sep_cards to be placed on the paper sheet placing table 3 (status C3 in FIG. 16). The lower surface of the paper sheet of the lowermost portion of the paper sheet group G_sep_cards comes into contact with the upper surfaces of the first flow path regulating portion 4_a_ and the second flow path regulating portion 4_b_ each having substantially the same height (substantially the same z-coordinate value), thus causing the paper sheet group G_sep_cards to be placed in a state substantially parallel to the upper surface of the paper sheet placing table 3.

When the force applied from the lowermost surface of the sheet group G_sep_cards is released, the elastic force of the helical spring installed on the first flap portion 5*a* and the second flap portion 5*b* causes the first flap portion 5*a* and the second flap portion 5*b* to rotate in the directionals DirA' and DirB' shown in FIG. 17 (state C4 of FIG. 17).

The upper surface of the uppermost paper sheet of the paper sheet group G_sep_cards then comes into contact with the lower surface of the first flap portion 5*a* and the lower surface of the second flap portion 5*b*, and the lower surface of the lowermost paper sheet of the paper sheet group G_sep_cards is biased upward by the elastic member Spr1 via the paper sheet placing table 3, the first flow path regulating portion 4*a*, and the second flow path regulating portion 4*b*. Accordingly, the paper sheet group G_sep_cards is held in a state of being sandwiched between the lower surfaces of the first flap portion 5*a* and the second flap portion 5*b* and the paper sheet placing table 3 (state C5 of FIG. 17).

1.2.3: Lock Processing

Next, in the paper sheet storage container 100, rotating the front panel portion 6 in the state C5 of FIG. 17, for example, in the direction of the arrow shown in FIG. 5 causing the front panel portion 6 to be closed. Accordingly, the locking protrusion 51*a* of the first flap portion 5*a* and the locking protrusion 5*b* of the second flap portion 51*b* are accommodated in the locking recesses 61*a* and 61*b* of the front panel portion 6, respectively, so that the first flap portion 5*a* and the second flap portion 5*b* cannot rotate around the rotational shafts rot_ax_5*a* and rot_ax_5*b*, respectively (locked state). This locked state can also be detected by a detection sensor (not shown). In this case, it is also possible to attach a detection sensor to the side of the front panel portion 6. This makes it possible to prevent forgetting to close the front panel portion 6.

1.2.4: Paper Sheet Take-out Processing

After the paper sheet storage container 100 is locked as described above, air (for example, an air flow) is caused to flow into the inside of the paper sheet storage container 100 from an external pump through, for example, pipes Pipe1 to Pipe4, holes Hole1(2*b*), Hole2(2*b*), and Hole3(2*b*) of the second side wall portion 2*b* of the paper sheet storage container 100, and a hole Hole1(2*c*) of the third side wall portion 2*c* (state D1 shown in FIGS. 18 and 19).

As shown in FIG. 10, the first flow path regulating portion 4*a* and the second flow path regulating portion 4*b* are arranged such that the flow rate to the vicinity of the center of the upper surface of the paper sheet placing table 3 increases when air flows into the inside of the paper sheet storage container 100 from the outside.

Further, the holes Hole1(2*b*), Hole2(2*b*), Hole3(2*b*), and Hole1(2*c*) in the side wall portion 2 are formed such that the height (z-coordinate value z_center) of the central axis thereof is substantially the same (substantially the same height) as the position of the upper surface of the paper sheet placing table 3 when no paper sheet is placed on the paper sheet placing table 3.

Thus, air (e.g., air flow) flowing, from the outside, into the inside of the paper sheet storage container 100 through the holes Hole1(2*b*), Hole2(2*b*), and Hole3(2*b*) of the second side wall portion 2*b* of the paper sheet storage container 100, and the hole Hole1(2*c*) of the third side wall portion 2*c* in the paper sheet storage container 100 causes the vicinity of the center of the upper surface of the uppermost paper sheet placed on the paper sheet placing table 3 to be raised.

For example, sucking the paper sheets in the state where the vicinity of the center of the upper surface has been raised by a robot arm or the like having a suction mechanism and then lifting the paper sheets upward in the sucked state allows for easily taking out the uppermost paper sheets from the paper sheet storage container 100.

This will be described with reference to FIGS. 18 to 20.

When air (e.g., air flow) flows into the inside of the paper sheet storage container 100 from the outside through the holes Hole1(2*b*), Hole2(2*b*) and Hole3(2*b*) of the second side wall portion 2*b* of the paper sheet storage container 100 and the holes Hole1(2*c*) of the third side wall portion 2*c*, the air is blown from the side (horizontally) to the uppermost paper sheet of the paper sheet group G_sep_cards because the heights (z-coordinate values) of the center axis of the holes Hole1(2*b*), Hole2(2*b*), Hole3(2*b*) and Hole1(2*c*) are substantially the same as the position (z-coordinate value) of the uppermost paper sheet of the paper sheet group G_sep_cards placed on the paper sheet placing table 3. As shown in FIG. 19, the paper sheet group G_sep_cards placed on the paper sheet placing table 3 has been sandwiched between the first flap portion 5*a* and the second flap portion 5*b* and the paper sheet placing table 3; and thus, when air is blown from the side (horizontally) to the uppermost paper sheet of the paper sheet group G_sep_cards placed on the paper sheet placing table 3, the air entering the lower surface of the uppermost paper sheet is concentrated in the vicinity of the center, thereby generating a state in which the upper surface of the uppermost paper sheet has been raised upward (state D2 in FIG. 19).

Then, in this state, for example, sucking the paper sheets in the state where the vicinity of the center of the upper surface has been raised by a robot arm or the like having a suction mechanism and then lifting the paper sheets upward in the sucked state allows for easily taking out the uppermost paper sheets from the paper sheet storage container 100 (state D3 in FIG. 19). Blowing the air into the paper sheet storage container 100 as described above leads to a state where the center portion of the paper sheet at the uppermost portion has been raised; thus, performing the processing as described above allows for reliably taking out paper sheets one-by-one.

After the uppermost paper sheet placed on the paper sheet placing table 3 is taken out, the second top paper sheet becomes the uppermost paper sheet, and the position (z-coordinate value (height)) of the paper sheet becomes substantially the same as the height (z-coordinate value) of the center axes of the holes Hole1(2*b*), Hole2(2*b*), Hole3(2*b*), and Hole1(2*c*) (state D1). Performing the same processing as described above also makes it possible to reliably take out the second top sheet, which is placed next to the top. Repeating this operation allows the paper sheets placed on the paper sheet placing table 3 to be reliably taken out one-by-one.

As shown in FIG. 20, when there remains only one paper sheet placed on the paper sheet placing table 3, the flow rate of the air flowing into the inside of the paper sheet storage container 100 increases in the vicinity of the center of the lower surface of the remaining last paper sheet due to the first flow path regulating portion 4*a* and the second flow path regulating portion 4*b*. Thus, the remaining last paper sheet is also in a state in which the vicinity of the center of the paper sheet has been raised (state D5).

Similarly to the above, in this state, for example, sucking the remaining last paper sheet in the state where the vicinity of the center of the upper surface has been raised by a robot arm having a suction mechanism, and then lifting the paper sheet upward in the sucked state allows for reliably taking out the remaining last paper sheet from the paper sheet storage container 100.

As described above, in the paper sheet storage container 100, the paper sheet group is held by the paper sheet placing table 3 and the first flap portion 5*a* and the second flap portion 5*b* whose rotation has been locked, while the paper sheet placing table 3 is being biased upward by the elastic member Spr1 so that the position (height) of the uppermost paper sheet of the paper sheet group placed on the paper sheet placing table 3 is substantially the same position (height) as the positions (heights) of the holes through which air flows. In this state, in the paper sheet storage container 100, air is blown from the side (horizontally) to the uppermost paper sheet of the paper sheet group placed on the paper sheet placing table 3, thereby allowing the uppermost paper sheet to be brought into a state in which the vicinity of the center thereof has been raised. In this state, sucking the vicinity of the center of the uppermost paper sheet and then lifting the paper sheet upward allows for easily and reliably taking out the uppermost paper sheet from the paper sheet storage container 100.

In other words, the paper sheet storage container 100 can accurately taking out paper sheets (for example, separator cards) one-by-one with a simple mechanism.

As described above, the paper sheet storage container 100 can accurately take out paper sheets (for example, separator cards) one-by-one with a simple mechanism, and thus can be used, for example, in a bill processing system, in a case of taking out separator cards one-by-one from a container containing a plurality of separator cards and then inserting the taken-out separator card into a bill bundle collected from a cash box. Note that the use of the paper sheet storage container 100 should not be limited to the above; the paper sheet storage container 100 may be used in applications where it is required to reliably take out paper sheets one-by-one.

Other Embodiments

In the above-described embodiment, a case has been described in which four holes are provided in the side wall portion 2 of the paper sheet storage container 100, but the present invention should not be limited thereto; the number of holes (air inflow ports) provided in the side wall portion 2 of the paper sheet storage container 100 may be other numbers (may be one). For example, in the paper sheet storage container 100, one or more holes may be provided in at least two of the first side wall portion 2*a*, the second side wall portion 2*b*, the third side wall portion 2*c*, and the front panel portion 6 (corresponding to four sides in plan view) (one or more holes may be provided in a member corresponding to at least two sides of the four sides in plan view).

Further, the shape of the hole of the side wall portion 2 may be another shape (for example, a cross section orthogonal to the central axis may have a shape other than a circle (for example, a rectangular shape or an oval shape)).

Further, in the above-described embodiment, the position (height (z-coordinate value)) of the hole of the side wall portion 2 is the height (height substantially the same as the paper sheet at the top of the paper sheet placing table 3) at which air can be blown from the side to the uppermost paper sheet placed on the paper sheet placing table 3, but the present invention should not be limited thereto; the hole may be provided in the side wall portion 2 such that the position (height (z-coordinate value)) of the hole of the side wall portion 2 is lower than the uppermost paper sheet placed on the paper sheet placing table 3 (for example, the position of the center axis of the hole is lower than the position of the uppermost paper sheet placed on the paper sheet placing table 3).

Figure 21:
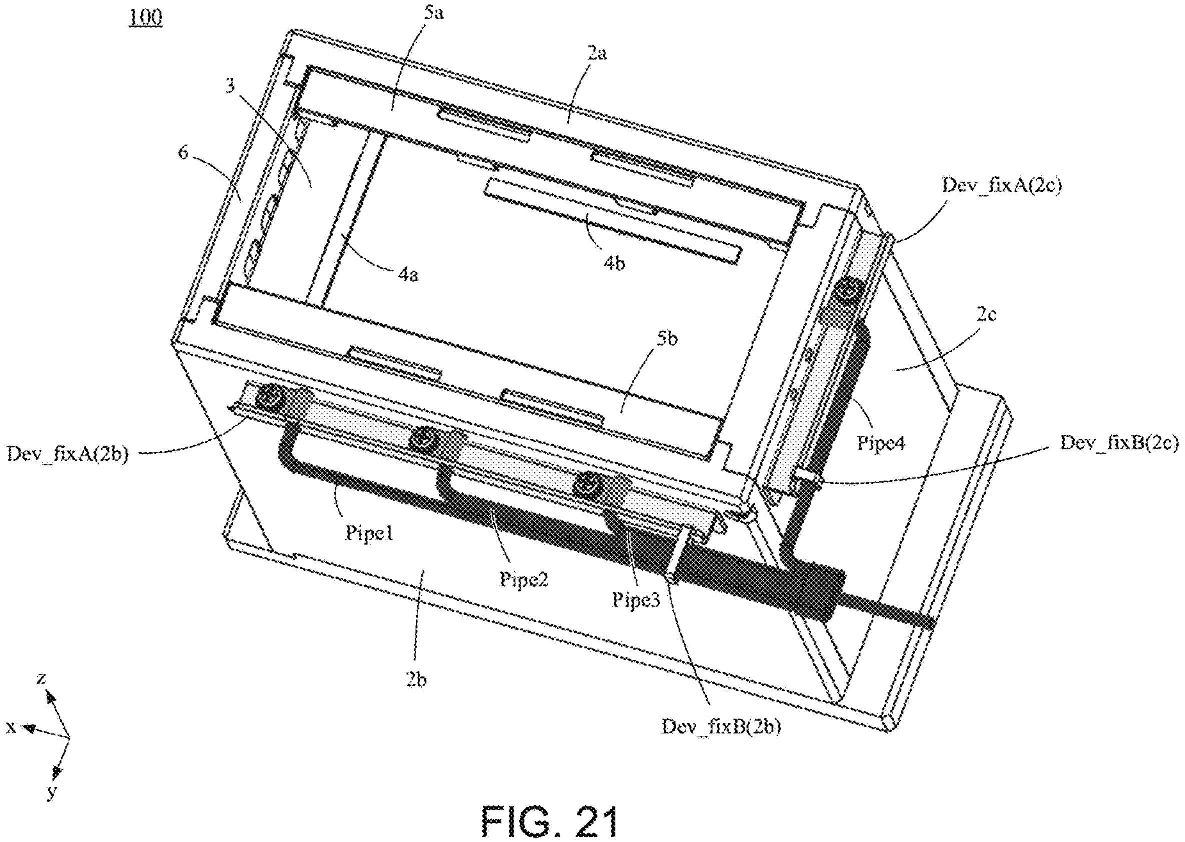
FIG. 21 is a perspective view of the paper sheet storage container 100, and is a diagram for explaining fixing members Dev_fixA and Dev_fixB for stably fixing pipes for allowing air to flow into the inside of the paper sheet storage container 100.

Further, as shown in FIG. 21, fixing members Dev_fixA and Dev_fixB for stably fixing pipes (for example, the pipes Pipe1 to Pipe4 in FIG. 21) for allowing air (for example, an airflow) to flow into the inside of the paper sheet storage container 100 may be installed in the paper sheet storage container 100.

As shown in FIG. 21, a fixing member Dev_fixA(2*b*) is installed on the second side wall portion 2*b*, guides the distal ends of the pipes Pipe1 to Pipe3 to holes provided in the second side wall portion 2*b*, and is connected to a fixing member Dev_fixB(2*b*) for bundling the pipes Pipe1 to Pipe3.

The fixing member Dev_fixB(2*b*) is a member for bundling the pipes Pipe1 to Pipe3, and is connected to the fixing member Dev_fixA(2*b*).

As shown in FIG. 21, a fixing member Dev_fixA(2*c*) is installed on the third side wall portion 2*c*, guides the distal end of the pipe Pipe4 to a hole provided in the third side wall portion 2*c*, and is connected to the fixing member Dev_fixB (2*c*) for fixing the pipe Pipe4.

The fixing member Dev_fixB(2*c*) is a member for fixing the pipe Pipe4, and is connected to the fixing member Dev_fixA(2*c*).

Installing such fixing members Dev_fixA(2*b*), Dev_fixB (2*b*), Dev_fixA(2*c*), and Dev_fixB(2*c*) in the paper sheet storage container 100 allowing pipes for leading flows (for example, an airflow) into the inside of the paper sheet storage container 100 to be stably arranged.

Further, in the above-described embodiment, a case where the paper sheet storage container 100 includes the holes, the first flow path regulating portion 4*a* (flow path restricting member), and the second flow path regulating portion 4*b* (flow path restricting member) that are disposed (arranged) as shown in FIG. 21 has been described, but the present invention should not be limited thereto; the arrangement of the holes, the first flow path regulating portion 4*a* (flow path restricting member) and the second flow path regulating portion 4*b* (flow path restricting member) in the paper sheet storage container 100 may be other arrangements.

Figure 22:
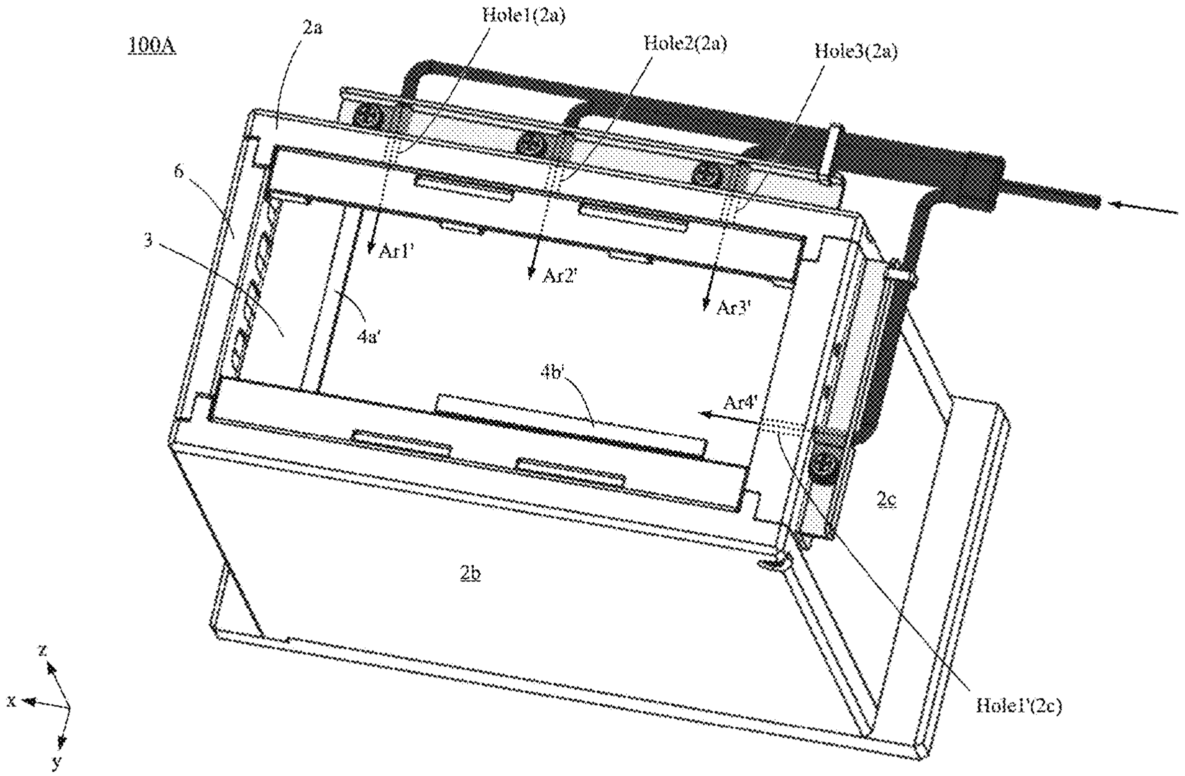
FIG. 22 is a perspective view showing an external appearance of a paper sheet storage container 100A.

FIG. 22 is an external view of the paper sheet storage container 100A in which the arrangement of the holes and the flow path regulating members has been changed. As shown in FIG. 22, three holes may be provided in the second side wall portion 2*a*; one hole may be disposed in the third side wall portion; and further, the first flow path regulating portion 4*a*' and the second flow path regulating portion 4*b*' may be disposed as shown in FIG. 22.

Figure 23:
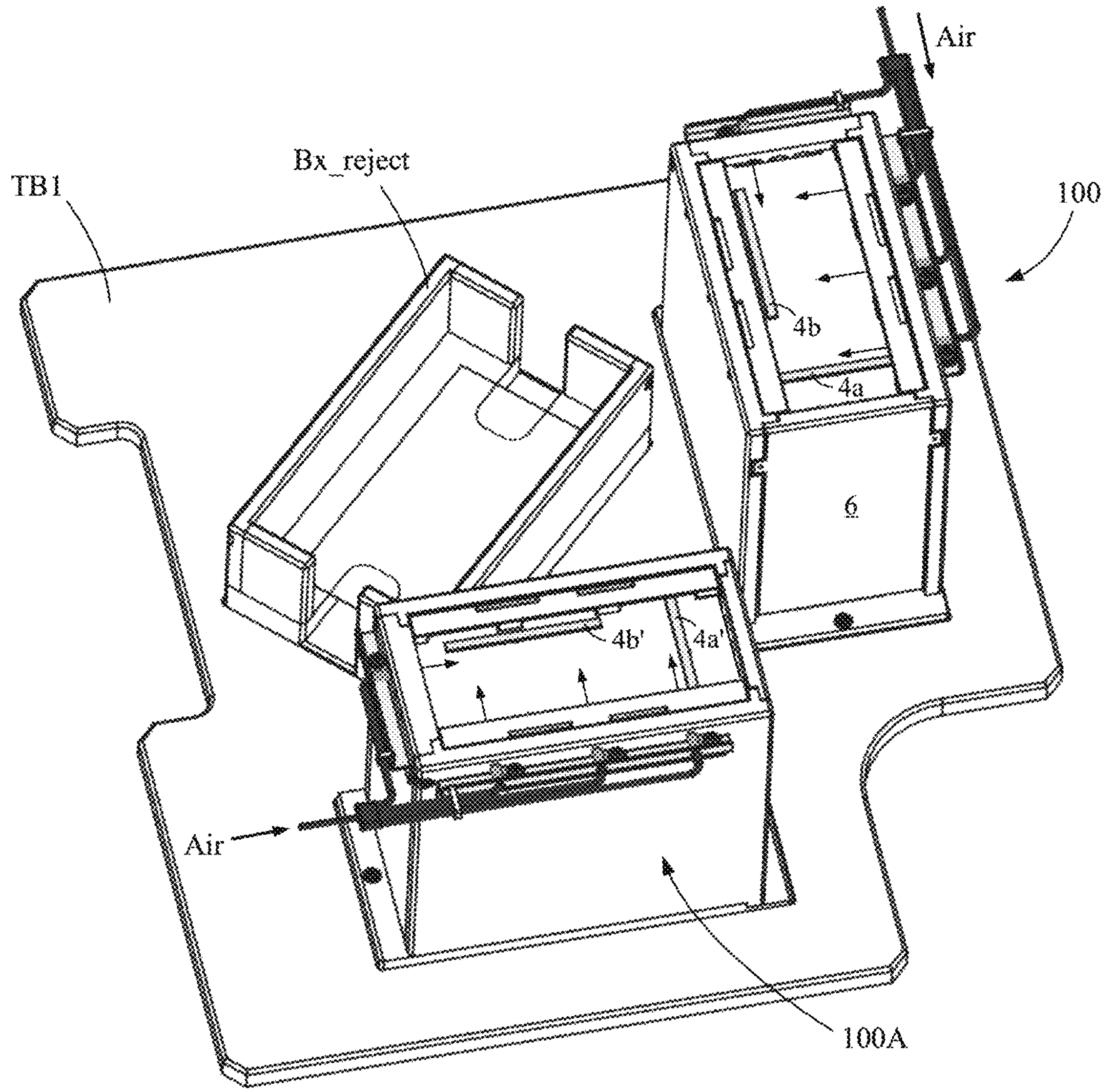
FIG. 23 is a diagram showing an exemplary arrangement of the paper sheet storage container 100 and the paper sheet storage container 100A.

Further, the paper sheet storage container 100 and the paper sheet storage container 100A whose arrangement of the holes and flow path regulating portions differs from each other may be arranged, for example, as shown in FIG. 23 to construct a system for taking out paper sheets from the paper sheet storage container 100 and the paper sheet storage container 100A. Note that FIG. 23 shows a table TB1 on which the paper sheet storage container 100, the paper sheet storage container 100A, and a waste container Bx_reject are disposed. The waste container Bx_reject is a container for storing paper sheets, which is to be discarded, taken out from the paper sheet storage container 100 and/or the paper sheet storage container 100A in a case where paper sheets that have been stored in the paper sheet storage container 100 and/or the paper sheet storage container 100A are, for example, irregular paper sheets (e.g., illegal separator cards).

The terms "substantially the same" and "substantial parallel" used in the above embodiments intend to permit an error occurring when control or the like is executed using a target value (or a design value) of being the same or using a target of being the parallel, or also permit an error determined depending on the resolution of the apparatus, and "substantially the same" or "substantial parallel" can include a range that a person skilled in the art determines (or recognizes) as being the same or being parallel.

In some example(s) in the above embodiments, only relevant member(s), among the constituent members of the embodiments of the present invention, necessary for describing the present invention are simplified and shown. Thus, the above embodiment(s) may include any constituent member that is not shown in the above embodiment(s). Also, in the above embodiment(s) and/or drawing(s), the dimensions of the members may not be faithfully (strictly) identical to their actual dimensions, their actual dimension ratios, or the like. Thus, the dimension(s) and/or the dimension ratio(s) may be changed without departing from the scope and the spirit of the invention.

The specific structures described in the above embodiments are mere examples of the present invention, and may be changed and modified variously without departing from the scope and the spirit of the invention.

REFERENCE SIGNS LIST

100 paper sheet storage container
1 bottom portion
2 side wall portion
3 paper sheet placing table
4*a* first flow path regulating portion (flow path regulating member)
4*b* second flow path regulating portion (flow path regulating member)
51*a*, 51*b* locking protrusion (lock mechanism)
61*a*, 61*b* locking recesses (lock mechanisms)
Spr1 elastic member

What is claimed is:

1. A paper sheet storage container comprising:
a bottom portion;
a paper sheet placing table configured to place paper sheets;
an elastic member disposed between the bottom portion and the paper sheet placing table, the elastic member being configured to urge the paper sheet placing table upward;
a pair of spaced holding members configured to hold opposite sides of paper sheets placed on the paper sheet placing table against the paper sheet placing table;
a side wall portion provided with at least one hole for allowing air to flow from the outside to a vicinity of a height substantially the same as a height at which a surface of an uppermost paper sheet is located when paper sheets are placed on the paper sheet placing table;
a flow path regulating member configured to regulate a flow path of the air, and;
wherein the flow path regulating member is provided on the paper sheet placing table is provided at a position that causes a flow rate of air in the vicinity of the center on the paper sheet placing table to be greater than a flow rate of air not in the vicinity of the center on the paper sheet placing table.

2. The paper sheet storage container according to claim 1 wherein the holding member is rotatably installed around a rotational shaft along an inner wall of the side wall portion near an upper end of the side wall portion.

3. The paper sheet storage container according to claim 2 wherein the holding member includes a lock mechanism configured to lock rotation.

4. The paper sheet storage container according to claim 3 wherein:
when the rotation has been locked by the lock mechanism, the holding member holds paper sheets placed on the paper sheet placing table against the paper sheet placing table, and
when the rotation has not been locked by the lock mechanism, the holding member rotates to allow the paper sheets to be inserted into the paper sheet storage container from the outside.

5. A paper sheet storage container comprising:
a bottom portion;
a paper sheet placing table configured to place paper sheets;
an elastic member disposed between the bottom portion and the paper sheet placing table, the elastic member being configured to urge the paper sheet placing table upward;
a pair of spaced holding members configured to hold opposite sides of paper sheets placed on the paper sheet placing table against the paper sheet placing table;
a side wall portion provided with at least one hole for allowing air to flow from outside to a position lower than a height at which a surface of an uppermost paper sheet is located when paper sheets are placed on the paper sheet placing table;
a flow path regulating member configured to regulate a flow path of the air; and
wherein the flow path regulating member is provided on the paper sheet placing table, and is provided at a position that causes a flow rate of air in the vicinity of the center on the paper sheet placing table to be greater than a flow rate of air not in the vicinity of the center on the paper sheet placing table.

6. The paper sheet storage container according to claim 5 wherein the holding member is rotatably installed around a rotational shaft along an inner wall of the side wall portion near an upper end of the side wall portion.

7. The paper sheet storage container according to claim 6 wherein the holding member includes a lock mechanism configured to lock rotation.

8. The paper sheet storage container according to claim 7 wherein:
when the rotation has been locked by the lock mechanism, the holding member holds paper sheets placed on the paper sheet placing table against the paper sheet placing table, and
when the rotation has not been locked by the lock mechanism, the holding member rotates to allow the paper sheets to be inserted into the paper sheet storage container from the outside.

9. A paper sheet storage container comprising:
a bottom portion;
a paper sheet placing table configured to place paper sheets;

an elastic member disposed between the bottom portion and the paper sheet placing table, the elastic member being configured to urge the paper sheet placing table upward;

a holding member configured to hold paper sheets placed on the paper sheet placing table against the paper sheet placing table;

a side wall portion provided with one or more holes for allowing air to flow from outside to a position lower than a height at which a surface of an uppermost paper sheet is located when paper sheets are placed on the paper sheet placing table; and one or more pipes configured to direct air into said one or more holes.

10. The paper sheet storage container according to claim 9 further comprising a flow path regulating member configured to regulate a flow path of the air.

11. The paper sheet storage container according to claim 10 wherein the flow path regulating member is provided on the paper sheet placing table, and is provided at a position that causes a flow rate of air in the vicinity of the center on the paper sheet placing table to be greater than a flow rate of air not in the vicinity of the center on the paper sheet placing table.

12. The paper sheet storage container according to any one of claim 9 wherein the holding member is rotatably installed around a rotational shaft along an inner wall of the side wall portion near an upper end of the side wall portion.

13. The paper sheet storage container according to claim 12 wherein the holding member includes a lock mechanism configured to lock rotation.

14. The paper sheet storage container according to claim 13 wherein:

when the rotation has been locked by the lock mechanism, the holding member holds paper sheets placed on the paper sheet placing table against the paper sheet placing table, and when the rotation has not been locked by the lock mechanism, the holding member rotates to allow the paper sheets to be inserted into the paper sheet storage container from the outside.

* * * * *